United States Patent
Denton et al.

(10) Patent No.: US 12,020,511 B1
(45) Date of Patent: Jun. 25, 2024

(54) ACTIVITY CLASSIFICATION AND REPETITION COUNTING

(71) Applicant: Amazon Technologies, Inc., Seattle, WA (US)

(72) Inventors: Samuel Marc Denton, Seattle, WA (US); Steven Sensarn, Milpitas, CA (US); Haithem Albadawi, Redmond, WA (US); Vashishtha Rajendra Patil, San Francisco, CA (US); Feross Salameh, Bothell, WA (US); Chaitra Hegde, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 17/487,324

(22) Filed: Sep. 28, 2021

(51) Int. Cl.
 *G06V 40/20* (2022.01)
 *A63B 24/00* (2006.01)
 *G01C 22/00* (2006.01)
 *G06N 20/00* (2019.01)

(52) U.S. Cl.
 CPC .......... *G06V 40/25* (2022.01); *A63B 24/0062* (2013.01); *G01C 22/006* (2013.01); *G06N 20/00* (2019.01); *A63B 2024/0068* (2013.01); *A63B 2024/0071* (2013.01); *A63B 2220/17* (2013.01); *A63B 2220/62* (2013.01)

(58) Field of Classification Search
 None
 See application file for complete search history.

(56) References Cited

U.S. PATENT DOCUMENTS

2016/0074706 A1* 3/2016 Morris ................. A61B 5/1123
                                               434/247

* cited by examiner

*Primary Examiner* — Kristy A Haupt
(74) *Attorney, Agent, or Firm* — Pierce Atwood LLP

(57) ABSTRACT

Techniques for detecting user activity and repetitions (rep) counting are described. A system may dynamically determine a threshold value for counting reps. The threshold value may be based on an activity predicted by the system using sensor data. The threshold value may be based on a rep rate. Changes in the threshold value may enable more accurate rep counting when a user is performing an activity that involves taking reps, such as, walking, running, rowing bicycling, etc., and may further cease counting of reps when a user is performing an activity that does not involve taking repetitions but may result in sensor data that triggers rep counting.

20 Claims, 11 Drawing Sheets

ACTIVITY CLASSIFICATION AND REPETITION COUNTING

BACKGROUND

Machine learning is a computing technique whereby a computing system can learn how to perform a specific task without explicitly being programmed to do so. Machine learning may be used to handle a number of different tasks of varying complexity. Machine learning computing may rely on trained models that are trained using training data sets. Once trained, a machine learning model may be capable of processing input data and producing output data that conforms to the function for which the model has been trained.

A user may perform certain activities, such as, walking, running, bicycling, etc. that may sometimes be referred to as fitness activities. Machine learning can be used to classify such activities that may be performed by a user.

BRIEF DESCRIPTION OF DRAWINGS

For a more complete understanding of the present disclosure, reference is now made to the following description taken in conjunction with the accompanying drawings.

DETAILED DESCRIPTION

Figure 1:
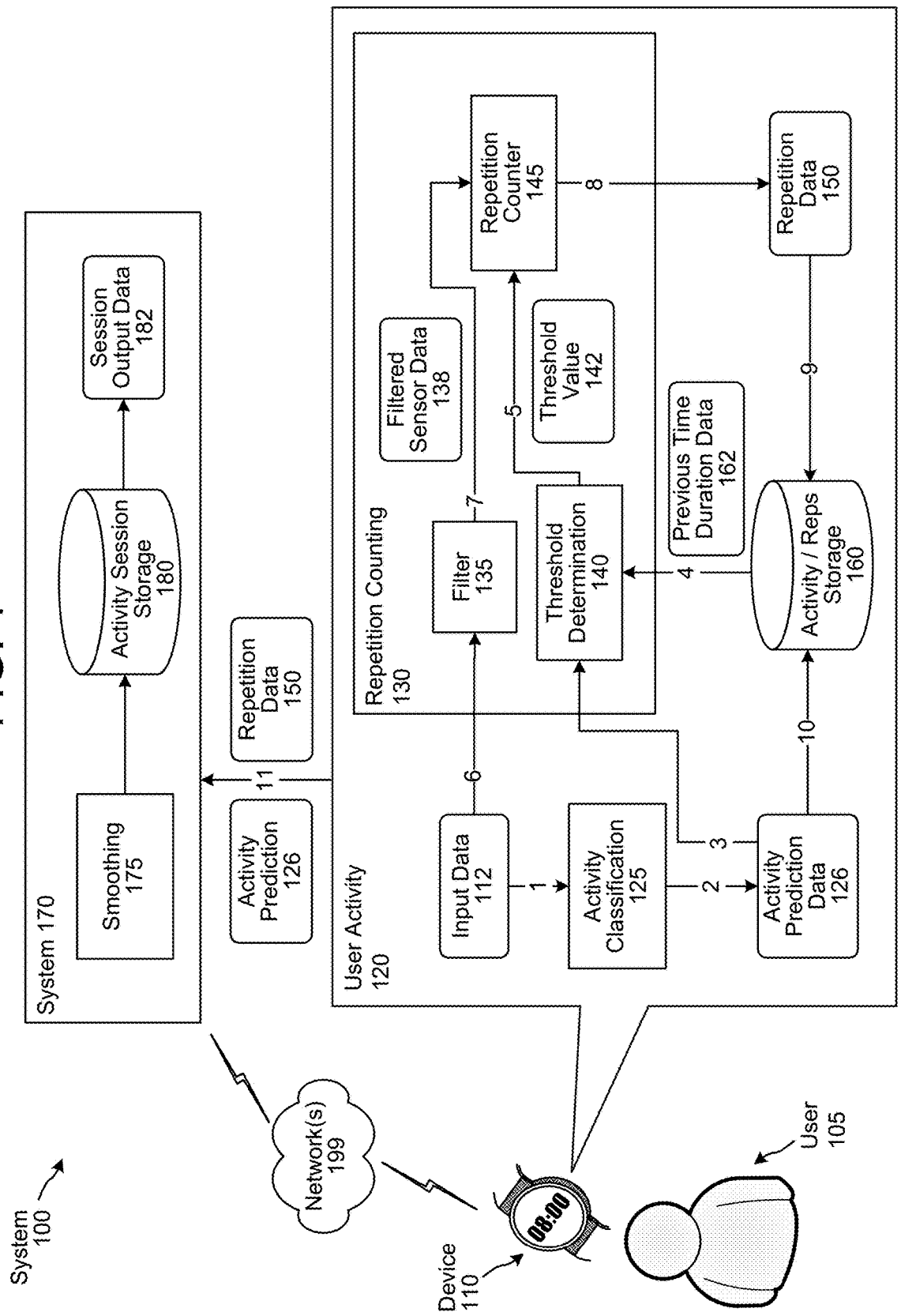
FIG. 1 is a conceptual diagram illustrating a system configured to classify user activity and/or count repetitions, according to embodiments of the present disclosure.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, and predictive analyses.

Trained models come in a variety of forms including trained classifiers, Support Vector Machines (SVMs), neural networks (such as deep neural networks (DNNs), recurrent neural networks (RNNs), and convolutional neural networks (CNNs)), random forests, isolation forests, and others. As an example, a neural network typically includes an input layer, an output layer and one or more intermediate hidden layers. The input layer is configured to take in a certain kind of data and the output layer is configured to output a desired kind of data to result from the network. The hidden layer(s) performs a variety of functions to generate output data from the input data.

A neural network, such as a CNN, may be used for classifying data into one of many categories. For example, a CNN may process sensor data (representing user activity) captured by a wearable device of a user. The CNN may be configured to classify the sensor data into user activity categories such as walking, running, rowing, cycling, or other. Such classification may help a fitness tracking application to trigger tracking of certain user's activity for fitness/exercise tracking purposes.

As part of tracking fitness/exercise goals, a user may want to know the number of steps taken by the user while walking or running or number of reps taken by the user while rowing or cycling. Such tracking may be referred to as rep counting. A rep counting technique may use sensor data to determine the number of reps taken by the user. For example, motion sensor data may be used to determine a number of steps taken by the user. In some cases, a step is counted when motion sensor data for a particular time duration satisfies a threshold value.

The present disclosure describes techniques for rep counting using a threshold value that is dynamically determined based on various factors. A system of the present disclosure may use sensor data captured by a device worn or held by a user. For example, the user may wear earbuds, a smartwatch, a fitness tracker (e.g., a wristband, a keychain, a necklace, a ring, etc.), smart glasses, or other device. In some embodiments, the system may use data captured by an accelerometer (e.g., a three-axis accelerometer) and/or other sensors (e.g., a GPS, a gyroscope, etc.) included the device. As another example, the user may hold a smartphone or keep a smartphone on the body (e.g., put the smartphone in a pants or shirt pocket, attach the smartphone to an arm or other body part using a band, etc.).

The system may use a magnitude of the accelerometer data, and may count a step each time the magnitude satisfies a dynamically determined threshold value. The system may use other sensor data, and may count a rep each time the sensor data satisfies a dynamically determined threshold value. In some embodiments, the threshold value may be based on the activity being performed by a user, where the activity may be predicted using a ML model and motion sensor data, or the activity may be indicated by the user. For example, if the user is walking (as predicted by the ML model or as indicated by the user) then the threshold value for counting steps may be lower than if the user is bicycling. As another example, if the user is rowing (as predicted by the ML model or as indicated by the user) the threshold value for counting reps may be lower than if the user is brushing teeth or cooking. As another example, the threshold value may be higher for an activity other than walking or running or other repetition-based activity, than the threshold value for a walking or running activity. Walking and running may be referred to as steps-based activities herein. Certain activities (such as bicycling, rowing, brushing teeth, cooking, etc.), other than walking and running, may result in the accelerometer data satisfying a step counting threshold value, and may result in the system counting "false positive" steps. Such activities may be referred to herein as non-steps based activities. Changing the threshold value based on the activity allows the system to count steps when the user is walking or running, while not counting steps during other activities that may cause false positive steps.

Activities that require repeated actions, like rowing and cycling may be referred to as repetition-based activities herein. Certain activities, other than repetition-based activities, may result in sensor data that satisfies a rep counting threshold value, and may result in the system counting "false positive" reps. Such activities may be referred to herein as non-repetition based activities. Changing the threshold value based on the activity allows the system to count reps when the user is performing repetition-based activities, while not counting reps during other activities that may cause false positive reps.

In some embodiments, the threshold value for rep/step counting may be based on the repetitions/steps counted for a previous time duration. For example, the threshold value may be based on a step rate (steps/minute) for the previous 30 seconds. In some cases, the ML model may predict the user performing an activity other than walking, even though the user may be walking and taking steps (e.g., the user may be talking on the phone while walking, the user may be pushing a cart or a stroller, etc.). In such cases, the threshold value may be lowered as the step rate increases so that steps are counted during certain walking activities that may be predicted as non-walking activities.

In some embodiments, the threshold value for rep/step counting may be based on activity predictions for a previous time duration. The system may be configured to predict an activity based on motion sensor data for a time duration (e.g., every 5 seconds). In some cases, the system may predict a non-walking or a non-running activity for a time duration while the user is walking or running. For example, the user may stop at a traffic light while walking or running, and the time duration the user stops may be predicted as non-walking activity or non-running activity. In example embodiments, the system may update such predictions to walking activity or running activity based on some previous number of predictions (e.g., the previous seven predictions) being walking activity or running activity. Based on updating the prediction for the time duration, the threshold value for that time duration may not be changed to correspond to a non-walking or non-running activity.

Teachings of the present disclosure provide an improved user experience by increasing the accuracy for rep counting. For example, the system of the present disclosure may count steps while the user is walking or running, and may not count steps while the user is performing other activities that usually trigger step counting.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

Techniques described herein may enable features such as automatic detection of fitness/exercise sessions, improved distance and step-count estimation, and repetition counting in workouts.

For some applications, it may be desirable to recognize a few user activities of interest while rejecting all others. For example, a wearable device may detect when the user is walking, running, cycling or rowing, and may begin tracking a fitness routine customized for that activity. For all other activities, such as cooking, eating, driving, watching TV, etc., no action may be taken. For such an application, the system described herein may label user activities as one of five classes: walking, running, cycling, rowing, or "other," where the "other" class may be a catch-all category capturing any activity that is not walking, running, cycling or rowing.

As another example, in some applications, the system may be configured to detect when the user is walking or running, and may begin tracking a fitness routine customized for that activity, and may also count steps taken by the user. For all other activities, no action may be taken. For such applications, the system described herein may label user activities as one of three classes: walking, running or "other."

FIG. 1 illustrates a system 100 configured to classify user activity and count steps, according to some embodiments. As shown, the system 100 may include a device 110 (local to a user 105) in communication with a system 170 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier network(s), and/or the like. Although the figures and discussion of the present disclosure illustrate certain steps in a particular order, the steps described may be performed in a different order (as well as certain steps removed or added) without departing from the present disclosure.

In some embodiments, the device 110 may be a wearable device, such as a smartwatch, a fitness tracker, smart earphones, etc. In other embodiments, the device 110 may be a smartphone or another type of device.

The device 110 may include one or more sensors (e.g., sensors 1017 shown in FIG. 10), such as an accelerometer, a gyroscope, or other type of sensors. The user 105 may wear the device 110 (e.g., on a wrist, on an arm, using a belt, etc.) or may keep the device 110 on a body of the user 105 (e.g., keep the device 110 in a clothing pocket, etc.) or otherwise with the user (such as in a bag or the like). As the user 105 performs an activity, the sensor(s) of the device 110 may capture data. For example, as the user 105 walks, the accelerometer of the device 110 may capture motion sensor data. As another example, as the user 105 cycles, the accelerometer of the device 110 may capture motion sensor data. As another example, as the user 105 rows, the gyroscope of the device 110 may capture angular velocity sensor data.

As shown in FIG. 1, in some embodiments, the device 110 may include a user activity component 120 configured to classify user activity and count reps taken by the user 105. The user activity component 120 may be installed, as an application, by the user 105 on the device 110. Input data 112 may be provided (step 1) to an activity classification component 125 of the user activity component 120. The input data 112 may be data captured by the sensor(s) of the device 110. For example, the input data 112 may be motion sensor data captured by the accelerometer of the device 110 for a duration of time. The motion sensor data may be represented as XYZ coordinates. The motion sensor data may be a vector or a matrix including XYZ coordinates for fixed time intervals for the duration of time. For example, the motion sensor data may correspond to five-seconds, and may include XYZ coordinates for 1-second intervals for the five-seconds. Alternatively, the motion sensor data may be a continuous data signal representing XYZ coordinate values detected by the accelerometer for the duration of time (e.g., 5-seconds). The motion sensor data may include a separate data signal for each coordinate, for example, a first data signal for the x-axis, a second data signal for the y-axis, and a third data signal for the z-axis.

In some embodiments, the input data 112 may include motion sensor data captured by another sensor, such as, a GPS of the device 110. In some embodiments, the input data 112 may include angular velocity data captured by a gyroscope of the device 110.

The activity classification component 125 may process the input data 112 to determine an activity being performed by the user 105. The activity classification component 125 may be configured to classify the input data 112 into one of predefined activity categories. In some embodiments, the activity classification component 125 may be configured to classify the input data 112 into a walking category, a running category, a cycling category, a rowing category, and a "other" category. In other embodiments, the activity classification component 125 may be configured to classify the input data 112 into a walking category, a running category, and/or another category. In some embodiments, the activity classification component 125 may use a neural network, like a CNN, to process the motion sensor data included in the input data 112. In some embodiments, the activity classification component 125 may be configured to process fixed-length sequences of time-series motion sensor data. For example, the activity classification component 125 may process with respect to a five-second interval of motion sensor data, and classify the five-second interval into one of the predefined activity categories.

The input data 112 may include, in some embodiments, motion sensor data for a period of time, and the activity classification component 125 may process portions of the motion sensor data corresponding to a time duration. The activity classification component 125 may process a first portion of motion sensor data corresponding to a first time duration (e.g., a first five-seconds interval) to determine first activity prediction data, may process a second portion of the motion sensor data corresponding to a second time duration (e.g., a second five-seconds interval) to determine second activity prediction data, and so on. The activity classification component 125 may process the first and second portions of the motion sensor data in parallel. Alternatively, the activity classification component 125 may process the first and second portions of the motion sensor data sequentially (in the order it is received).

In some embodiments, the user activity component 120 may implement another component that may process the input data 112 prior to the activity classification component 125, and may be configured to determine whether the user 105 is potentially performing a repetition-based activity. This other component (e.g., a first pass activity classifier) may be a classifier model, another type of ML model, a rules-based engine, or may employ other techniques for processing the input data 112. The component may be configured to determine whether the motion sensor data or other sensor data included in the input data 112 is cyclical (i.e. corresponding to a cyclical/repetitive movement by the user 105). The component may employ an autocorrelation technique that may analyze a continuous data signal(s) included in the input data 112 to determine a correlation between portions of the data signal(s). For example, the autocorrelation technique may determine a number of peak values, magnitude values, etc. for portions of the data signals. Based on the result of the autocorrelation technique, the component may determine if a cyclical motion is being performed by the user 105. If the component determines that the user 105 is performing repetitive movements, then the component may send the input data 112 to the activity classification component 125 for processing.

The activity classification component 125 may output (step 2) activity prediction data 126. The activity prediction data 126 may correspond to a particular time duration, for example, the five-second interval of the motion sensor data. The activity prediction data 126 may be text data representing an activity category predicted by the activity classification component 125. For example, the activity prediction data 126 may be "walking", "running", "cycling", "rowing", "other", etc. Alternatively, the activity prediction data 126 may be a numerical value corresponding to a category identifier for the activity category predicted by the activity classification component 125. For example, the activity prediction data 126 may be "0" for other category, "1" for a walking category, "2" for a running category, etc. Alternatively or additionally, the activity prediction data 126 may include one or more scores representing a likelihood of the input data 112 corresponding to one or more respective activity categories. For example, the activity prediction data 126 may be {walking=0.8; running=0.1; cycling=0.1; rowing=0, other=0}.

As shown in FIG. 1, the user activity component 120 may include a repetition counting component 130 configured to count steps taken by the user 105. The repetition counting component 130 may include a threshold determination component 140 configured to determine a threshold value 142 to be used for counting activity repetitions (reps). As used herein, activity reps refers to a number of times a user performs a repetition for an activity. For example, activity reps counted for walking or running may be a number of steps counted while the user is walking or running. As another example, activity reps counted for rowing may be a number of strokes counted while the user is rowing. As another example, activity reps counted for cycling may be a number of pedal revolutions counted while the user is cycling. The threshold determination component 140 receives (step 3) the activity prediction data 126 corresponding to the instant portion of the input data (e.g., a first five-second interval of motion sensor data). The threshold determination component 140 may also receive (step 4) previous time duration data 162 from an activity/reps storage 160. The activity/reps storage 160 may store activity prediction data corresponding to input data for previous time durations. The activity prediction data 126 (determined in step 2) may correspond to a current time duration, and the activity/reps storage 160 may store activity prediction data for a previous time duration (occurring prior to the current time duration). For example, the activity/reps storage 160 may store first activity prediction data corresponding to a first five-seconds interval and second activity prediction data corresponding to a second five-seconds interval, where the first and second five-second intervals may occur prior to the five-second interval corresponding to the activity prediction data 126 determined in step 2.

Additionally, the activity/reps storage 160 may store repetition data corresponding to input data for previous time durations. For example, the activity/reps storage 160 may store first repetition data corresponding to a first five-seconds interval and second repetition data corresponding to a second five-seconds interval, where the first and second five-second intervals may occur prior to the five-second interval corresponding to the activity prediction data 126 determined in step 2. The repetition data may indicate a number of repetition counted by the repetition counting component 130 as described herein.

The activity prediction data and the repetition data stored in the activity/reps storage 160 may be associated with time data, such as a timestamp corresponding to the time (or time window, duration, etc.) of a predicted activity. In some embodiments, the activity/reps storage 160 may be a temporary storage to track activity prediction data and repetition data for a defined period time or a defined number of data points, so that previous time duration data 162 can be used by the threshold determination component 140 to determine the threshold value 142 as described below.

The previous time duration data 162 may include activity prediction data and/or repetition data corresponding to previous time durations within a period of time of the instant time duration processed by the activity classification component 125. For example, the previous time duration data 162 may correspond to 30-seconds prior to the instant time duration. Alternatively, the previous time duration data 162 may include a defined number of previously determined data points. For example, the previous time duration data 162 may include the most recent seven activity predictions and/or the most recent seven step counts determined by the user activity component 120. In yet other embodiments, the previous time duration data 162 may include a defined number of previously determined data points within a defined period of time prior to the instant time duration. For example, the previous time duration data 162 may include the most recent three activity predictions and/or the most recent three step counts determined in 30-seconds prior to the instant time duration.

The threshold determination component 140 may determine the threshold value 142 based on the activity prediction data 126 and/or the previous time duration data 162. The threshold determination component 140 may determine the threshold value 142 based on the type of activity being performed by the user 105. The threshold determination component 140 may determine the threshold value 142 based on a number of reps counted for the user 105 for a prior occurring period of time. For example, the threshold value 142 may be based on the particular number of reps the user 105 has taken in the prior 30 seconds or 60 seconds. The threshold determination component 140 may determine the threshold value 142 based on a repetition rate for a prior occurring time period. For example, the threshold value 142 may be based on the repetition rate (reps/minute) based on the prior 60 seconds.

In some embodiments, the threshold determination component 140 may determine a threshold value for each time duration (e.g., five-second interval) of input data being processed by the repetition counting component 130. In some embodiments, the threshold determination component 140 may keep track of a previous threshold value used with respect to counting activity reps for a previous time duration, and may update (e.g., increase, decrease, replace with a new value) the previous threshold value to determine a current threshold value to be used to count activity reps for the current time duration. In this manner, the threshold value 142 may be dynamically determined and may vary for each time duration.

The threshold determination component 140 may output the threshold value 142, which may be a numerical value (e.g., 0.05, 0.0425, etc.), such that when the filtered sensor data 138 exceeds the threshold value, a repetition is counted.

Figure 2:
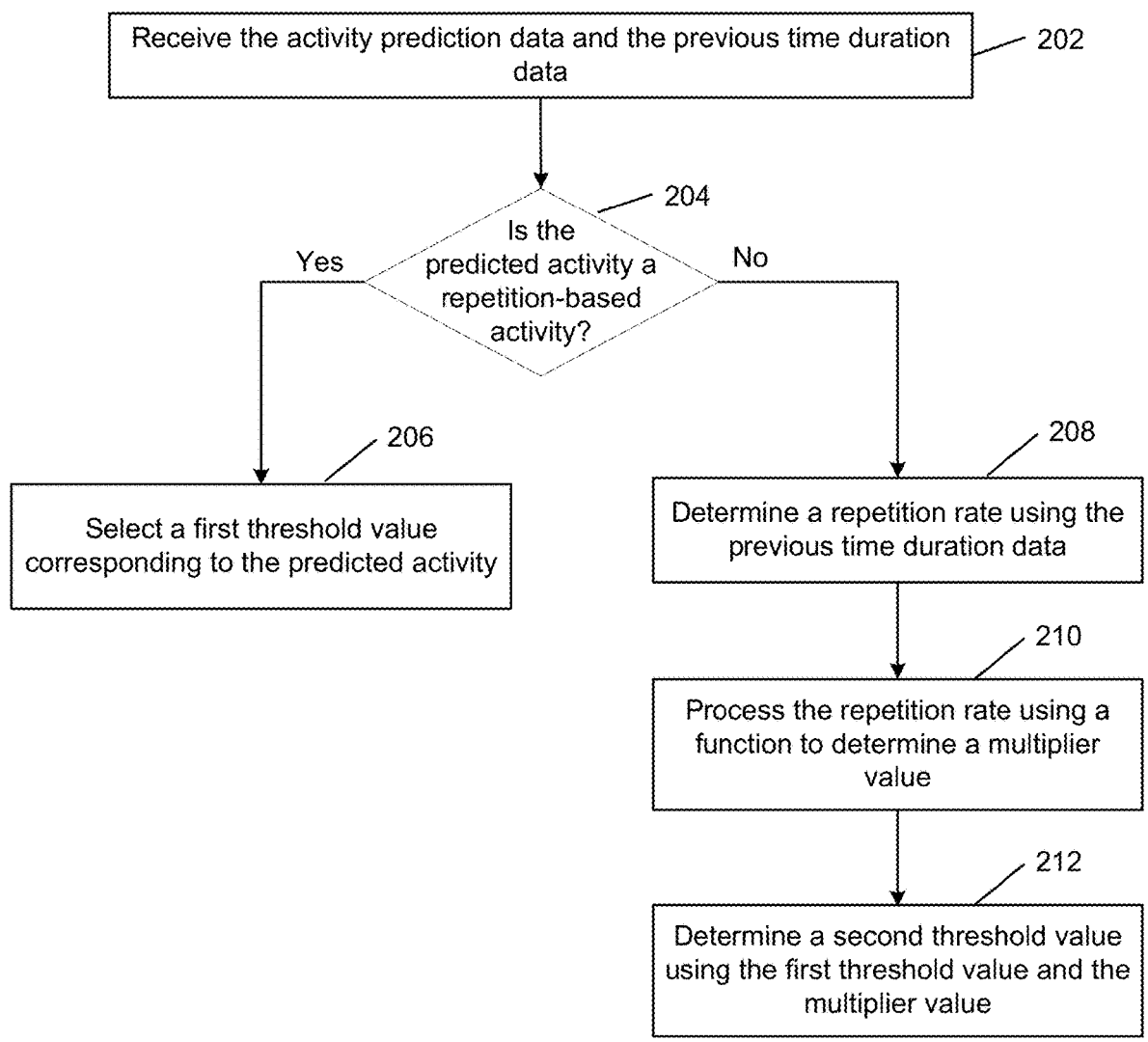
FIG. 2 illustrates an example process that may be performed for determining a threshold value for counting repetitions, according to embodiments of the present disclosure.

FIG. 2 illustrates an example process that may be performed by the threshold determination component 140 to determine the threshold value 142. The threshold determination component 140 may receive (step 202) the activity prediction data 126 and the previous time duration data 162. The threshold determination component 140 may determine (decision block 204) whether the predicted activity, represented in the activity prediction data 126, is a repetition-based activity. If the predicted activity is a repetition-based activity, then the threshold determination component 140 may select (step 206) a first threshold value corresponding to the predicted activity. The threshold determination component 140 may store a predefined first threshold value corresponding to a repetition-based activity. Such predefined first threshold value may be used for multiple different users of the system 170. In other embodiments, the predefined first threshold value may be customized for the user 105, and may be based on historic user activity data for the user 105. In some embodiments, the threshold determination component 140 may store a different threshold values for different repetition-based activities. For example, the threshold determination component 140 may store a threshold value corresponding to a walking activity, a different threshold value corresponding to a running activity, a different threshold value corresponding to a rowing activity, a different threshold value corresponding to a bicycling activity, etc. Based on which activity is predicted to be being performed by the user 105, the threshold determination component 140 may select the corresponding threshold value. The selected first threshold value may be outputted as the threshold value 142.

If the predicted activity is not a repetition-based activity (e.g., is another activity, such as "other"), then the threshold determination component 140 may determine (step 208) a repetition rate using the previous time duration data 162. For example, the repetition rate may be based a number of steps counted for a prior time period (e.g., prior 60 seconds). As another example, the repetition rate may be based on a number of rowing strokes counted for a prior time period. As another example, the repetition rate may be based on a number of cycle pedal revolutions counted for a prior time period. As described above, the previous time duration data 162 may include repetition data for prior time durations. In some embodiments, the repetition rate may be an average number of repetitions counted for a prior time period (e.g., average number of reps for past 5 minutes).

The threshold determination component 140 may process (step 210) the repetition rate using a function to determine a multiplier value. The function used to determine the multiplier value may be a linear function, a quadratic function, a piece-wise function or other type of function. The function may be configured/trained using historic activity data for multiple different users. Based on the repetition rate, the function may be configured to determine a multiplier value that increases or decreases the threshold value for counting reps. For example, if the repetition rate is high, then the function may be configured to determine a multiplier value that lowers/decreases the threshold value. As another example, if the repetition rate is low, then the function may be configured to determine a multiplier value that raises/increases the threshold value. In some embodiments, the function may be personalized for the user 105 and may be based on historic activity data for the user 105. In other embodiments, the multiplier value may be determined using a ML, model, which may take as input the repetition rate, the predicted activity included in the activity prediction data 126, and/or other data (e.g., historic activity data for the user 105, user preference, sensor data, etc.). In other embodiments, the multiplier value may be determined using a rule(s), which may be based on the repetition rate, the predicted activity included in the activity prediction data 126, and/or other data (e.g., historic activity data for the user 105, user preference, sensor data, etc.).

In some embodiments, the function may be considered a blending factor or function which interpolates between the two threshold values depending on how much the repetition rate (e.g., a step rate, a row stroke rate, a cycle pedaling rate, etc.) deviates from a normal/expected repetition rate (for walking, running, rowing, cycling, etc.). If the repetition rate is consistently normal/within the expected range for the past time period (e.g. 80 steps/min) but the predicted activity is "other," then the function may determine a multiplier value that causes the threshold value to be between a low threshold value (e.g., for walking) and a high threshold value (e.g., for "other" activity), based on the repetition rate itself and how far the repetition rate deviates from pre-set normal/expected repetition rates.

The threshold determination component 140 may determine (step 212) the second threshold value using the first threshold value and the multiplier value. As described above, the first threshold value may be a predefined threshold value corresponding to a repetition-based activity. The threshold determination component 140 may multiply the first threshold value and the multiplier value to determine the second threshold value. The second threshold value may be higher or lower than the first threshold value. The second threshold value may be outputted as the threshold value 142.

In determining the first threshold value and the second threshold value as described above, the threshold determination component 140 may make it "easier" to count steps when the user 105 is walking or running (i.e. performing an activity that involves taking steps), and it make it "harder" to count steps when the user 105 is performing other activities (i.e. activities that do not involve taking steps). For example, gradually reducing the threshold value 142 as the step rate (repetition rate) increases may allow for better step counting during true positive activities that may be subject to non-walk predictions, like walking while talking on phone, stroller or cart pushing, etc. As another example, gradually reducing the threshold value 142 as the rowing stroke rate (repetition rate) increases may allow for better rep counting during true positive activities that may be subject to non-rowing predictions. As another example, gradually increasing the threshold value 142 as the step rate (repetition rate) decreases may allow to count less steps while the user is performing a non-step based activity.

Figure 3:
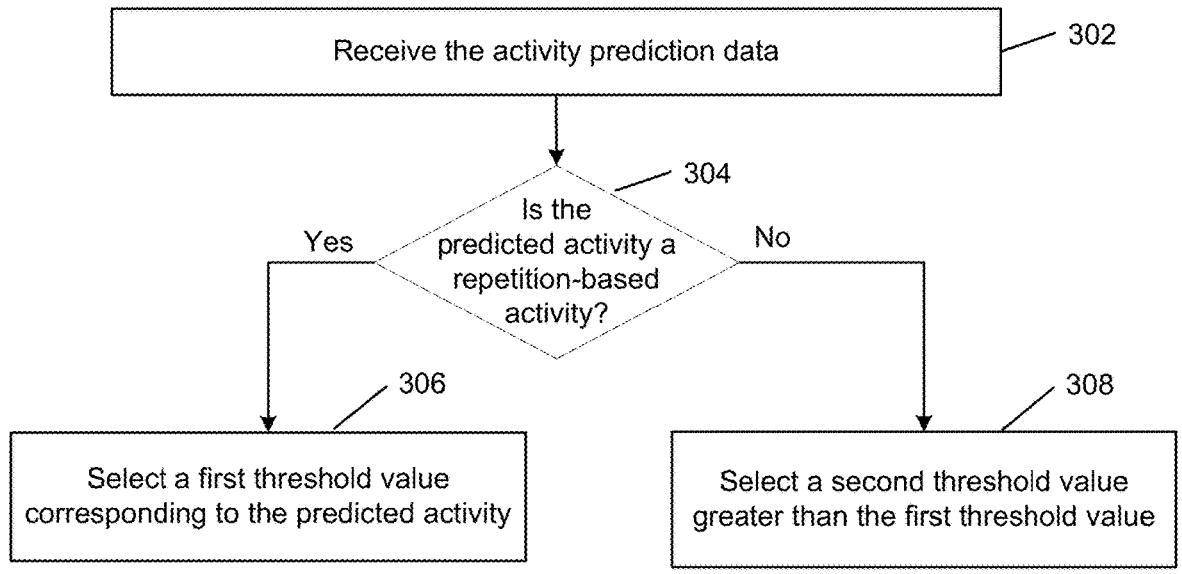
FIG. 3 illustrates another example process that may be performed for determining a threshold value for counting repetitions, according to embodiments of the present disclosure.

FIG. 3 illustrates another example process that may be performed by the threshold determination component 140 for determining the threshold value 142 based on the activity prediction data 126. The threshold determination component 140, in this example, may receive (step 302) the activity prediction data 126. The threshold determination component 140 may determine (decision block 304) if the predicted activity, included in the activity prediction data 126, is a repetition-based activity. If the predicted activity is a repetition-based activity, then the threshold determination component 140 may select (step 306) a first threshold value corresponding to the predicted activity. The threshold determination component 140 may store a predefined first threshold value corresponding to a repetition-based activity. Such predefined first threshold value may be used for multiple different users of the system 170. In other embodiments, the predefined first threshold value may be customized for the user 105, and may be based on historic user activity data for the user 105. In some embodiments, the threshold determination component 140 may store different threshold values for different repetition-based activities. For example, the threshold determination component 140 may store a threshold value corresponding to a walking activity, a different threshold value corresponding to a running activity, a different threshold value corresponding to a rowing activity, a different threshold value corresponding to a bicycling activity, etc. Based on which activity is predicted to be being performed by the user 105, the threshold determination component 140 may select the corresponding threshold value. The selected first threshold value may be outputted as the threshold value 142.

If the predicted activity is not a repetition-based activity, then the threshold determination component 140 may select (step 308) a second threshold value greater than the first threshold value. The threshold determination component 140 may store a predefined second threshold value corresponding to a non-repetition-based activity. Such predefined second threshold value may be used for multiple different users of the system 170. In other embodiments, the predefined second threshold value may be customized for the user 105, and may be based on historic user activity data for the user 105. The selected second threshold value may be outputted as the threshold value 142.

In selecting the second threshold value greater than the first threshold value, the threshold determination component 140 may make it "harder" to count reps when the user 105 is performing activities that does not require repetition.

Figure 4:
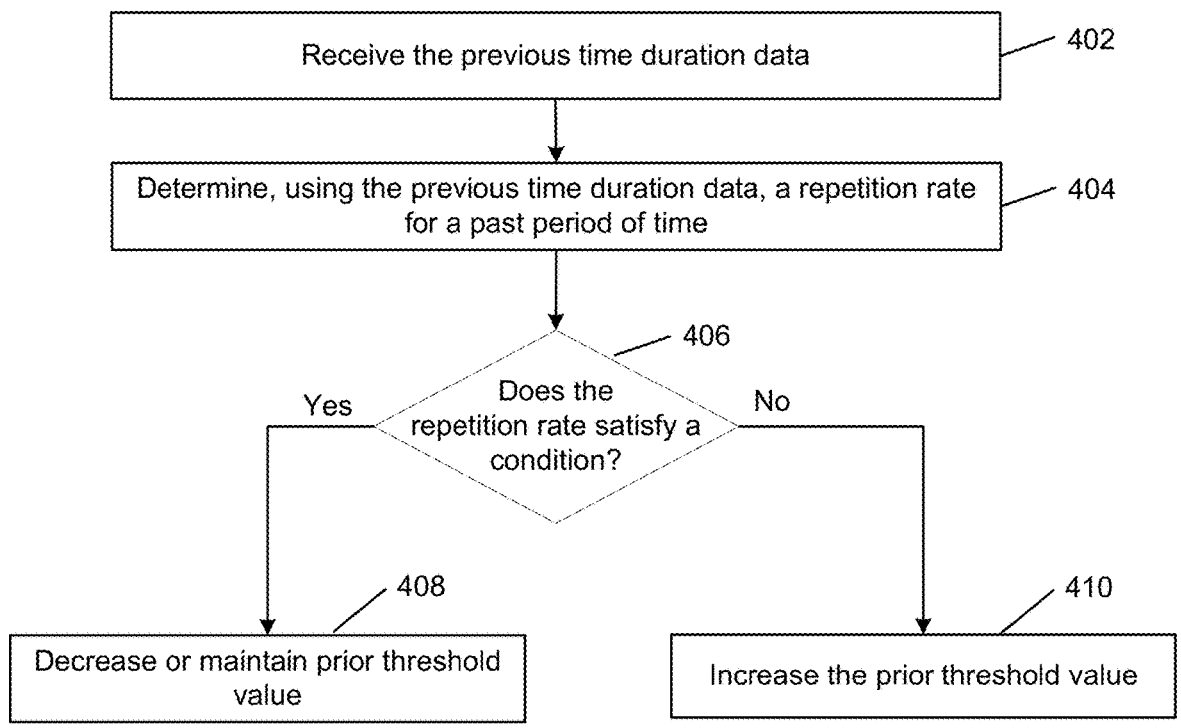
FIG. 4 illustrates another example process that may be performed for determining a threshold value for counting repetitions, according to embodiments of the present disclosure.

FIG. 4 illustrates another example process that may be performed by the threshold determination component 140 for determining the threshold value 142 based on the previous time duration data 162. The threshold determination component 140, in this example, may receive (step 402) the previous time duration data 162. The threshold determination component 140 may determine (step 404), using the previous time duration data 162, a repetition rate for a past period of time. For example, the repetition rate may be based on a number of steps, as indicated in the previous time duration data 162, taken by the user 105 during the past 60 seconds. As another example, the repetition rate may be based on a number of rowing strokes counted for a prior time period. As another example, the repetition rate may be based on a number of cycle pedal revolutions counted for a prior time period. In some embodiments, the repetition rate may be an average number of reps taken by the user 105 during a past time period (e.g., the past 60 seconds, the past 5 minutes, etc.).

The threshold determination component 140 may determine (decision block 406) whether the repetition rate satisfies a condition (e.g., a minimum repetition rate value). The condition may relate to a normal/expected repetition rate. For example, the condition may be a step rate value expected when a user is walking or running. As another example, the condition may be a row stroke rate value expected when a user is rowing. As another example, the condition may be a cycle pedal rate value expected when a user is cycling. If the repetition rate satisfies the condition, then the threshold determination component 140 may decrease or maintain (step 408) a prior threshold value (corresponding to a prior time duration). For example, if the repetition rate exceeds a minimum repetition rate value (i.e. the user 105 is or has been most recently performing an activity that involves taking reps), the prior threshold value may be decreased so it is "easier" to count reps. Alternatively, the prior threshold value may be maintained so that reps continue to be counted. The decreased or maintained prior threshold value may be outputted as the threshold value 142.

If the repetition rate does not satisfy the condition, then the threshold determination component 140 may increase (step 410) a prior threshold value (corresponding to a prior time duration). For example, if the repetition rate does not exceed a minimum repetition rate value (i.e. the user 105 is not or has not been most recently performing an activity that involves taking reps), the prior threshold value may be increased so it is "harder" to count reps. The increased prior threshold value may be outputted as the threshold value 142.

In some embodiments, the threshold determination component 140 may determine the threshold value 142 based on GPS data captured by the device 110. When the GPS data indicates that the user 105 has remained within a certain area/range, the threshold value 142 may be increased/higher so that steps or reps are not counted. When the GPS data indicates that the user 105 is moving, the threshold value 142 may be decreased/lower so that steps or reps are counted.

In some embodiments, the threshold determination component 140 may determine the threshold value 142 based on gyroscope data captured by the device 110. For example, when the device 110 is worn by the user 105 on a wrist, the gyroscope data may represent a certain number of rotations (based on the wrist being rotated) or may indicate that the user 105 is performing an activity requiring movement of the wrist that does not correspond to walking or running (or other steps-based activities), and based on the gyroscope data the threshold determination component 140 may increase or use a higher threshold value to make it "harder" to count steps, since the user 105 is not performing a step-based activity. In other cases, the threshold value for counting reps may be decreased to make it "easier" to count reps, such as, rowing reps.

The repetition counting component 130 may receive (at step 6) the input data 112. The input data 112 may be the same data processed by the activity classification component 125, and may thus, include a portion of motion sensor data corresponding to a time duration (e.g., a five-second interval). In some embodiments, the repetition counting component 130 may receive the input data 112 at the same time or approximately the same time as the activity classification component 125 receives the input data 112. In some embodiments, the repetition counting component 130 may process in parallel to the activity classification component 125.

As shown in FIG. 1, the repetition counting component 130 may include a filter component 135. The filter component 135 may determine a magnitude value (or continuous magnitude signal) of the motion sensor data in the case that the motion sensor data is represented as XYZ coordinates. The filter component 135 may then apply a band pass filter to the XYZ magnitude to determine filtered sensor data 138. In some embodiments, the filter component 135 may implement a high pass filter. In other embodiments, the filter component 135 may implement a butterworth filter. Other types of filters may also or alternatively be used by the filter component 135.

A repetition counter component 145 of the repetition counting component 130 may receive (at step 5) the threshold value 142 to be used for the current time duration, and may also receive (at step 7) the filtered sensor data 138. The repetition counter component 145 may be configured to count reps based on a number of times the filtered sensor data 138 satisfies the threshold value 142. The filtered sensor data 138 may be a waveform data signal (e.g., 504 shown in FIG. 5). In some embodiments, the repetition counter component 145 may count a rep when a falling edge of the waveform representing the filtered sensor data 138 passes or meets the threshold value 142.

The repetition counter component 145 may output (step 8) repetition data 150 representing a number of repetitions counted for the instant duration of time (e.g., the instant five-seconds interval). For example, the repetition data 150 may be a number of steps counted for the instant duration of time. As another example, the repetition data 150 may be a number of rowing strokes counted for the instant duration of time. As another example, the repetition data 150 may be a number of cycle pedal revolutions counted for the instant duration of time. The repetition data 150 may be stored (step 9) in the activity/reps storage 160 and may be associated with a timestamp representing the instant time duration. The activity prediction data 126 (outputted by the activity classification component 125) may also be stored (step 10) in the activity/reps storage 160 and may be associated with the timestamp representing the instant time duration.

In some embodiments, the user activity component 120 may cause the device 110 to output a representation of the activity prediction data 126. For example, the device 110 may display text, an icon(s) or other visual output indicating an activity, determined by the activity classification component 125, as being performed by the user 105 (e.g., walking, running, cycling, or rowing). Additionally or alternatively, the device 110 may output audio representing synthesized speech indicating the determined activity (e.g., the device 110 may output synthesized speech representing "Running detected", "Starting your walking routine", or the like) and/or some haptic feedback from a haptic component of the device 110. The device 110 may also output a (visual and/or audio) notification indicating to the user 105 that an activity being performed by the user 105 is detected. In some embodiments, the representation of the activity prediction data 126 may be presented with a time information indicating when detection of the activity begins.

In some embodiments, the user activity component 120 may cause the device 110 to output a representation of the repetition data 150 or accumulated repetition data for a period of time. As described above, the repetition data 150 may correspond to steps counted during a time duration (e.g., a five-second interval). In some embodiments, the device 110 may update a representation of reps taken by the user 105 when the repetition data 150 is determined. In other embodiments, the device 110 may update a representation of reps taken by the user 105 when the repetition data 150 for a period of time is accumulated (e.g., reps counted may be updated every 30 minutes, every hour, etc.). The device 110 may output text, icons or other visual outputs indicating the number of reps counted by the user activity component 120. Additionally or alternatively, the device 110 may output audio representing synthesized speech indicating the reps counted (e.g., the device 110 may output synthesized speech representing "1000 steps" or the like). The device 110 may also output a (visual and/or audio) notification indicating to the user 105 that the repetition counter is updated. In some embodiments, the representation of the repetition data 150 may be presented with a timestamp indicating when certain reps are counted. In some embodiments, the device 110 may present output data indicating whether the user 105 satisfied a repetition goal (a number of total reps to be taken within a period of time). In some embodiments, when the repetitions counted satisfies the repetition goal, the device 110 may output a (visual and/or audio) notification.

The user activity component 120 may send (step 11) the activity prediction data 126 and the repetition data 150 corresponding to the time duration (e.g., a five-second interval) to the system 170. The system 170 may be configured to track activity for the user 105 for a period of time, and may perform processing on activity prediction data and repetition data accumulated over a period of time. In some embodiments, the user activity component 120 may send the activity prediction data 126 and the repetition data 150 to the system 170 when they are determined (e.g., for each five-second interval). In other embodiments, the user activity component 120 may send the activity prediction data 126 and the repetition data 150 after accumulating them for a period of time (e.g., every 1 minute, every 5 minutes, etc.). In some embodiments, each of the activity prediction data 126 and the repetition data 150 may include a timestamp representing a time duration corresponding to the data (e.g., timestamp=12h:05m:05s-12h:05m:10s).

In some embodiments, one or more components and functionalities of the user activity component 120 may be included and performed by another device 110 (e.g., a smartphone, a tablet, a computer, etc.) associated with the user 105. For example, the user 105 may wear a first device 110a that may capture the input data 112 while the user 105 is performing certain activities, and the input data 112 may be sent to a second device 110b, associated with the user 105, for processing (e.g., activity classification, rep counting, etc.). In some embodiments, the first device 110a may predict an activity being performed by the user 105 using the input data 112, and may send the activity prediction data 126 and the input data 112 to the second device 110b for rep counting.

A smoothing component 175 of the system 170 may process accumulated activity prediction data 126 for a period of time, and may "smooth" any irregularities in the predicted activities. In some cases, based the activity classification component 125 determining activity predictions using motion sensor data for a duration of time, the activity classification component 125 may determine a different activity category for a particular time duration than the activity category of immediately prior time durations and subsequent time durations. In such cases, the smoothing component 175 may determine that the activity classification component 125 misclassified that particular time duration, and may update the activity category for that time duration to match the activity category in the series of time durations. For example, the activity classification component 125 may determine a walking category for a first time duration (e.g., a first five-second interval), a walking category for a second/next time duration, an "other" category for a third/next time duration, and a walking category for a fourth/next time duration. In this example, the smoothing component 175 may update the activity category for the third time duration to be a walking category. The smoothing component 175 may consider a certain number of prior and/or subsequent activity predictions in determining whether a particular activity prediction is to be updated. The smoothing component 175 may also use other data to determine when activity prediction data is to be changed (e.g., receiving a user-indicated activity as described below, GPS data, other sensor data, past historic user activity data, etc.). The smoothing component 175 may update the activity category for time durations based on other factors as well. The smoothing component 175 may use various techniques relating to data smoothing/processing.

In some embodiments, the smoothing component 175 may process accumulated repetition data 150 for a period of time, and may "smooth" any irregularities in the counted repetitions. The repetition data 150 may represent a number of repetitions counted for a time duration (e.g., 5-seconds interval). In some cases, when the number of repetitions are below a certain number, the smoothing component 175 may update the repetition data 150 to represent zero repetitions. In such cases, the number of repetitions counted may be unusually low, such that a user cannot perform such low number of repetitions for the time duration, and thus any repetitions counted for the time duration likely represent "false positive" repetitions. For example, if the repetition data 150 represents 5 steps counted for a 5-seconds interval, then the smoothing component 175 may update the particular repetition data 150 to be 0 steps counted based on it being unreasonable for a user to take only 5 steps during 5 seconds. The smoothing component 175 may use different number of repetitions for different activities to determine whether the counted reps are unreasonable or unusual based on the activity being performed by the user 105. In some embodiments, the number of repetitions used for smoothing may be personalized for the user 105.

The output of the smoothing component 175 may be stored in an activity session storage 180. The activity session storage 180 may be configured to store data for user activities for a period of time. The activity session storage 180 may store data for multiple different users, including the user 105, and may associate stored data with an activity session identifier and a profile identifier for the respective user. The activity session identifier may identify a particular activity session involving the user 105 performing a single/same activity for at least a particular period of time. For example, a first activity session identifier may be associated with data indicating the user 105 walking for 30 minutes, and a second activity session identifier may be associated with data indicating the user 105 running for 10 minutes. The running activity session may occur right after the walking activity session, but may be assigned a different activity session identifier based on a change in the activity being performed. In other embodiments, a single/same activity session identifier may be associated with different activities within a period of time. For example, the user 105 may start an exercise routine involving walking, running and cycling during one hour. The activity session storage 180 may store data associated with an activity session identifier and indicating the user 105 performed the three different activities during that activity session.

The system 170 may store activity session data in the activity session storage 180 to track activities performed by the user 105 and steps taken by the user 105. Certain activities, like walking and running, may be associated with step data, in the activity session storage 180, representing the number of steps taken by the user 105 while walking or running. The data in the activity session storage 180 may also include corresponding timestamps representing when the activities are performed by the user 105 and when the steps are taken by the user 105.

After accumulating activity session data for the user 105 for a period of time (e.g., 24 hours, 12 hours, 6 hours, 1 hour, etc.), the system 170 may determine session output data 182. The session output data 182 may indicate one or more activities performed by the user 105 during the period of time and steps counted for the user 105 during the period of time. In some cases, the session output data 182 may also include the timestamps representing when the activity occurred and when the steps were taken. The system 170 may send the session output data 182 to the device 110. The device 110 may output text, icons or other visual outputs corresponding to the session output data 182.

In some embodiments, the device 110 may receive one or more inputs from the user 105 selecting an activity that the user 105 is performing or is about to start performing. The user 105 may provide a touch input via a screen of the device 110, and may select an icon and/or text representing the activity (e.g., the user may touch a "walking" icon, the user may touch a "rowing" icon, etc.). Additionally or alternatively, the user 105 may provide a voice input selecting the activity. For example, the user 105 may say "start my rowing exercise" or "I am going to run now." The user activity component 120 may process the received input(s) and determine the activity the user 105 is performing, and may use the user-indicated activity as the activity prediction data 126, may provide the user-indicated activity to the activity classification component 125 as an additional input to the input data 112, may provide the user-indicated activity to the threshold determination component 140 as an additional input to the activity prediction data 126, and/or may send the user-indicated activity to the system 170.

Figure 5:
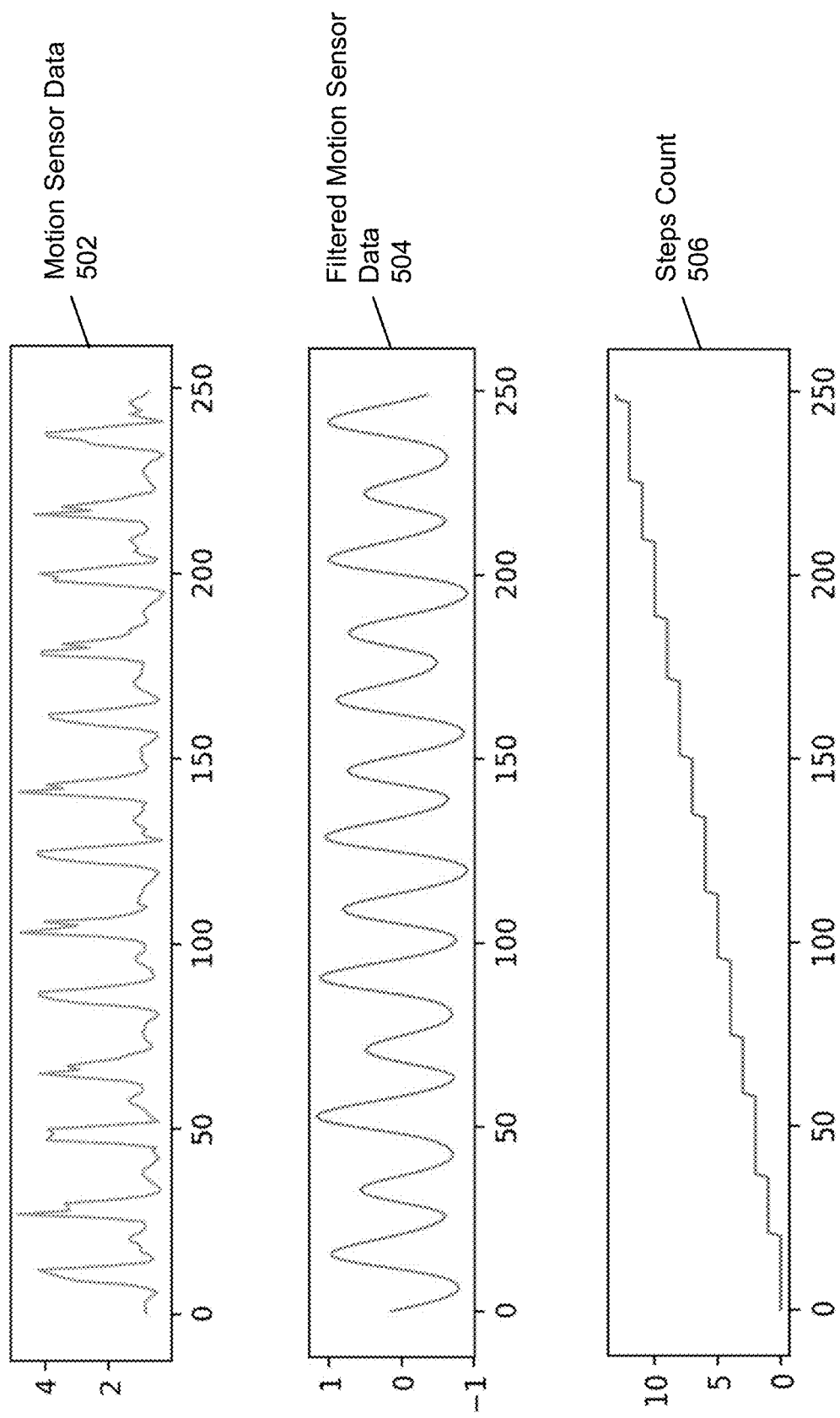
FIG. 5 illustrates example data that may be processed by the system, according to embodiments of the present disclosure.

FIG. 5 illustrates example data that may be processed by the user activity component 120. The shown example motion sensor data 502 may be included in the input data 112, and may be captured by an accelerometer of the device 110. The shown example filtered motion sensor data 504 may be the filtered sensor data 138 determined by the filter component 135. The shown example steps count 506 may be the repetition data 150 determined by the repetition counter component 145. The steps count 506 may be based on the filtered motion data 504 satisfying a threshold value (e.g., each time the filtered motion data 504 crosses the threshold value, the steps count is incremented).

In some embodiments, the activity classification component 125 may use a combination of trained models for classifying motion sensor data into particular user activity categories while rejecting unforeseen activities as "other." A first trained model, which may be a neural network, may be configured to classify motion sensor data into specific activity categories (e.g., walking, running, cycling, rowing or other), and a second trained model and a third trained model (which may be isolation forests) may be configured to determine whether the prediction of the first trained model is an outlier of the predicted activity category (in other words, the input data corresponds to unforeseen activity, which the first trained model was not trained to identify).

Figure 6:
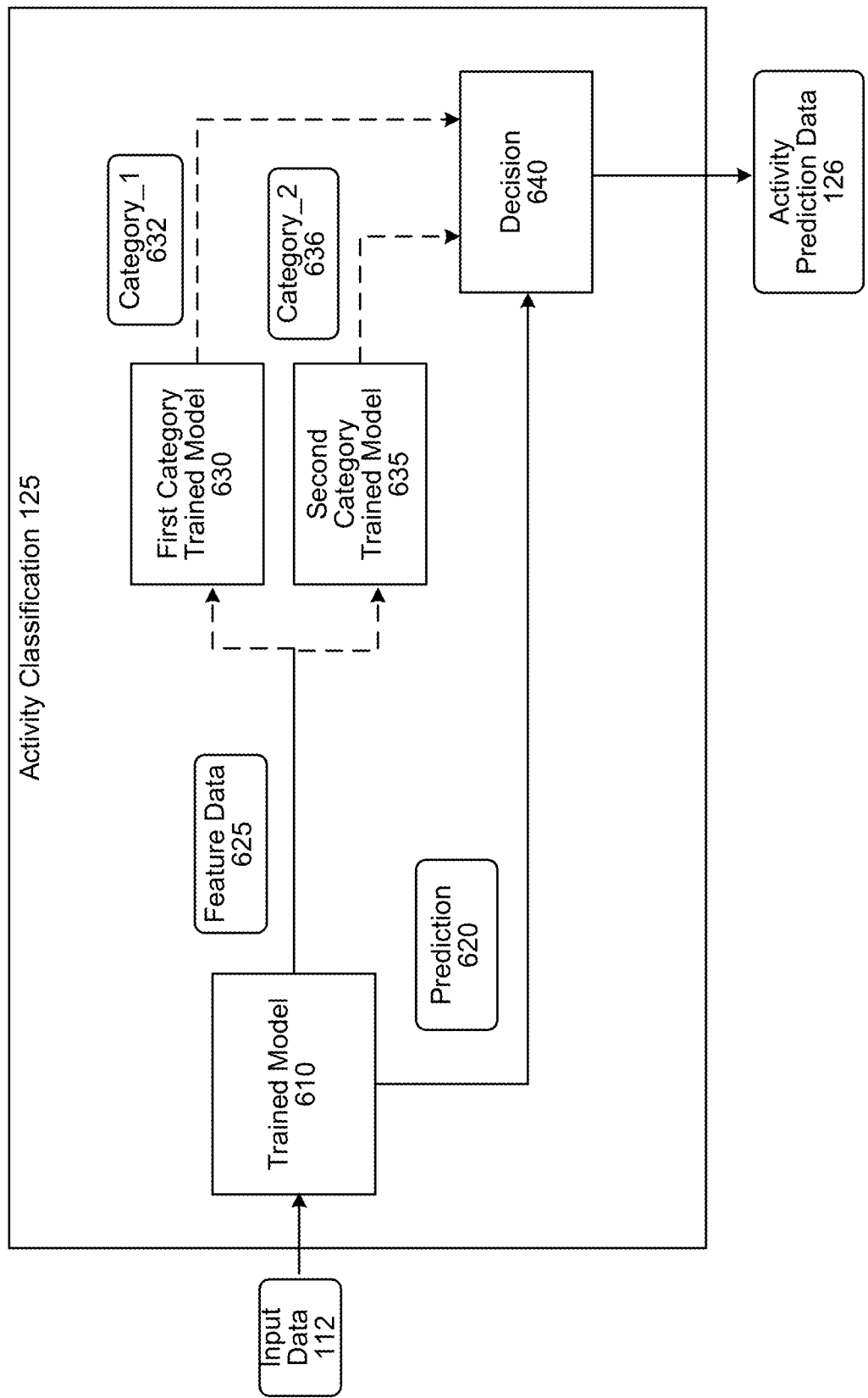
FIG. 6 is a conceptual diagram of components for performing activity classification using a combination of machine learning models, according to embodiments of the present disclosure.

FIG. 6 is a conceptual diagram of components for performing activity classification using a combination of machine learning models, according to some embodiments. The activity classification component 125 may include a trained model 610, a first category trained model 630 and a second category trained model 635. The trained model 610 may be configured to determine an initial classification of input data 112 into one of a first category or a second category. The first category trained model 630 may be configured to determine whether the input data 112 is an outlier for the first category. Likewise, the trained model 635 may be configured to determine whether the input data 112 is an outlier for the second category. A decision component 640 may process the predictions generated by the trained model 610, the trained model 630, and the trained model 635, and may determine a final prediction for the input data 112.

The trained model 610, in the example embodiment illustrated in FIG. 6, may be configured to classify input data 112 into two categories, and thus, the activity classification component 125 includes a first trained model 630 corresponding to a first category and a second trained model 635 corresponding to a second category. In other example embodiments, the trained model 610 may be configured to classify input data 112 into more than two categories, in which case the activity classification component 125 includes a first trained model 630 corresponding to a first category, a second trained model 635 corresponding to a second category, a third trained model corresponding to a third category, etc. In some embodiments, the activity classification component 125 may include as many category-specific trained models, configured to determine outliers for a specific category of interest, as the initial trained model (e.g., 610) is configured to classify data into.

The trained model 610 may process the input data 112 to generate prediction data 620 representing a category (e.g., the first category, the second category or the "other" category) that the input data corresponds to. The prediction data 620 may be a category identifier corresponding to the category predicted by the trained model 610. In some embodiments, the prediction data 620 may include a probability score corresponding to how confident the trained model 610 is that the input data 112 corresponds to the predicted category.

The trained model 610 may also generate feature data 625 representing one or more features that activate an intermediate layer of the trained model 610. In an example embodiment, the trained model 610 may be a CNN, and may consist of multiple convolutional layers, small sample kernels, rectified linear unit (ReLU) activations and/or pooling layers (e.g., global-average-pooling (GAP) layer). The output of one of the layers (e.g., the GAP layer) may be used as the feature data 625 to be analyzed by the trained models 630 and 635, while a final softmax output may be used to generate the prediction data 620.

The feature data 625 may be evaluated by the trained models 630 and 635. In some embodiments, the activity classification component 125 may cause only one of the trained models 630 or 635 to process the feature data 625. For example, if the prediction data 620 indicates that the input data 112 corresponds to the first category, then the activity classification component 125 may only cause the trained model 630 for the first category to process the feature data 625. In another example, if the prediction data 620 indicates that the input data 112 corresponds to the second category, then the activity classification component 125 may only cause the trained model 635 for the second category to process the feature data 625.

In some embodiments, the activity classification component 125 may process motion sensor data using the trained model 610, which may be a CNN, to generate an activity prediction. The activity classification component 125 may determine which activity category is predicted by the CNN. If the activity category is "other" category, then the activity classification component 125 may output the "other" category as the activity prediction data 126. If the predicted activity category is the first category (e.g., walking category), then the activity classification component 125 may process the feature data 625, from the CNN, using the first category trained model 630, which may be an isolation forest corresponding to the first category. Based on the processing by the isolation forest for the first category, the activity classification component 125 may determine if the input is an outlier for the first category. If the input is not an outlier, then the activity classification component 125 may output the first category (e.g., walking category) as the activity prediction data 126 corresponding to the input data 112. If the input is an outlier for the first category, then the activity classification component 125 may output "other" category as the activity prediction data 126 corresponding to the input data 112.

If the activity category predicted by the CNN is a second category (e.g., a running category), then the activity classification component 125 may process the feature data 625, from the CNN, using the second category trained model 635, which may be an isolation forest corresponding to the second category. Based on the processing by the isolation forest for the second category, the activity classification component 125 may determine if the input is an outlier for the second category. If the input is not an outlier, then the activity classification component 125 may output the second category as the activity prediction data 126 corresponding to the input data 112. If the input is an outlier for the second category, then the activity classification component 125 may output "other" category as the activity prediction data 126 corresponding to the input data 112.

In this manner, the activity classification component 125 may cause only one of the isolation forests to process the feature data based on the prediction of the CNN. Although the process describes classification of input data based on a first category, a second category and a "other" category (for input data that does not fall under the first category or the second category), it should be understood that that the process may be used to for classifying input data based on fewer than two or more than two categories.

In some embodiments, the activity classification component 125 may cause both of the trained models 630 and 635 to process the feature data 625. For example, the activity classification component 125 may process motion sensor data included in the input data 112 using the trained model 610, which may be a CNN, to generate a first activity prediction corresponding to the input data 112. The activity classification component 125 may then process the feature data 625, from the CNN, using the first category trained model 630, which may be an isolation forest corresponding to a first activity category, to generate a second prediction (of whether the input data 112 corresponds to the first activity category or not). The activity classification component 125 may process the feature data 625 using the second category trained model 635, which may be an isolation forest corresponding to a second activity category, to generate a third prediction (of whether the input data corresponds to the second activity category or not).

The activity classification component 125 may process the first prediction (from the CNN), the second prediction (from the isolation forest corresponding to the first activity category), and the third prediction (from the isolation forest corresponding to the second activity category). Based on the foregoing processing, the activity classification component 125 may determine if the input data 112 is an outlier for the first activity category and the second activity category. If the input data 112 is an outlier for both of the first activity category and the second activity category (based on the second prediction and the third prediction), then the activity classification component 125 may output "other" activity category as the activity prediction data 126 corresponding to the input data 112.

If the input data 112 is not an outlier for both of the first activity category and the second activity category, then the activity classification component 125 may determine if the input data 112 corresponds to the first activity category (based on the first prediction). If the input data corresponds to the first activity category, then the activity classification component 125 may output the first activity category as the activity prediction data 126 corresponding to the input data 112. If the input data does not correspond to the first activity category, then the activity classification component 125 may output the second activity category as the activity prediction data 126 corresponding to the input data 112.

Thus, if the input data 112 is deemed to be an outlier by both isolation forests, it is considered unlikely to belong to the first or second activity category, and is therefore classified as "other;" otherwise, the prediction from the CNN is used. The isolation forests therefore may override the CNN prediction, in some cases, when both determine the input data to be an outlier.

The trained model 630, corresponding to the first category, may be configured to determine whether the input data 112 is an outlier for the first category. The trained model 630 may output category_1 data 632 indicating whether the input data 112 is an outlier. For example, the category_1 data 632 may be a Boolean value, where 0 may indicate that the input data 112 is an outlier and 1 may indicate that the input data 112 belongs to the first category (or vice-versa, where 0 indicates that the input data 112 belongs to the first category and 1 indicates that the input data 112 is an outlier). In another example, the category_1 data 632 may be a probability/score representing a likelihood of the input data 112 being an outlier or belonging to the first category. For example, category_1 data 632 of "1" may indicate the input data 112 absolutely belongs to the first category and category_1 data 632 of "0" may indicate the input data 112 is absolutely an outlier of the first category, and vice versa.

The trained model 635, corresponding to the second category, may be configured to determine whether the input data 112 is an outlier for the second category. The trained model 635 may output category_2 data 636 indicating whether the input data 112 is an outlier. For example, the category_2 data 636 may be a Boolean value, where 0 may indicate that the input data 112 is an outlier and 1 may indicate that the input data 112 belongs to the second category (or vice-versa, where 0 indicates that the input data 112 belongs to the second category and 1 indicates that the input data 112 is an outlier). In another example, the category_2 data 636 may be a probability/score representing a likelihood of the input data 112 being an outlier or belonging to the second category. For example, category_2 data 636 of "1" may indicate the input data 112 absolutely belongs to the second category and category_2 data 636 of "0" may indicate the input data 112 is absolutely an outlier of the first category, and vice versa.

In an example embodiment, the trained models 630 and 635 may be isolation forests. The feature data 625 extracted from a layer output of the trained model 610 may be input to independent isolation forests: one trained on the first category samples and one trained on the second category samples. Each forest may be an ensemble of 16 trees trained to isolate samples via random cuts on features. The more cuts required to isolate a sample, and hence the depth of the tree reached during execution, the more likely the sample is an inlier of the distribution. Conversely, feature data 625 corresponding to the "other" category (other than the first and second categories) may generally require fewer splits to isolate from the inlier population and may be classified as an outlier by thresholding a mean depth score of the forest. If such input data 112 is determined to be an outlier by both forests, the input data may be classified as "other," regardless of the prediction of the trained model 610. The threshold on the mean depth score, below which samples are considered outliers, may be determined based on a contamination hyperparameter (set equal to 1% in an example embodiment).

The decision component 640 may be configured to process the prediction data 620, the category_1 data 632, and the category_2 data 636 to determine the final prediction data 645. The final prediction data 645 may represent that the input data 112 corresponds to the first category, the second category or the other category. The final prediction data 645 may be a category identifier.

In some embodiments, the decision component 640 may select the prediction of the trained model 610 if the prediction data 620 indicates the input data 112 belongs to the "other" category. In some embodiments, the decision component 640 may determine that the input data 112 corresponds to the other category when the trained model 610 predicts the input data 112 corresponds to the first category but the trained model 630 determines the input data 112 is an outlier for the first category. In some embodiments, the decision component 640 may determine that the input data 112 corresponds to the other category when the trained model 610 predicts the input data 112 corresponds to the second category but the trained model 635 determines the input data 112 is an outlier for the second category. In some embodiments, the decision component 640 may determine that the input data 112 corresponds to the first category when the trained model 610 predicts the input data 112 corresponds to the first category and the trained model 630 determines the input data 112 belongs to the first category. In some embodiments, the decision component 640 may determine that the input data 112 corresponds to the second category when the trained model 610 predicts the input data 112 corresponds to the second category and the trained model 635 determines the input data 112 belongs to the second category.

In an example embodiment, the activity classification component 125 may include a neural network for the trained model 610 and isolation forests for the trained models 630 and 635. Through a supervised learning process, the neural network may learn to extract features which maximally separate samples, based on their ground-truth labels, so that a final classification layer—a linear transformation with softmax activation—can optimally categorize them. However, when faced with unforeseen samples in the "other" category, the neural network may misclassify them based on their proximity to the categories of interest in the feature space. To mitigate this, the activity classification component 125 leverages the isolation forests to reject these samples lying outside the boundaries of the categories of interest (i.e., the categories corresponding to the trained models 630 and 635). The foregoing hybrid architecture improves the robustness of the activity classification component 125 against data for new categories unavailable at the time of training, lessening the burden of coverage in the training dataset. Due to the limited size of the neural network and high efficiency of isolation forest implementation, the activity classification component 125 can run on a microcontroller (MCU), allowing for wearable devices to execute the activity classification component 125.

During training of a neural network, the network learns to separate known classes (using supervised learning) to achieve the highest classification accuracy possible. This is done by optimizing network weights in such a way as to maximally delineate labeled samples provided for training. Due to how neural networks are trained to perform classification, a neural network may misclassify data that falls in a "gray area" where the data may have characteristics belonging to more than one category. For example, a problem may arise when using neural networks to classify some user activities while rejecting all other types of user activities. Some activities may lie nearby the activities of interest in the feature space and thus may be captured by the neural network as predictions of that activity category. For example, biking may look similar to running, and the neural network may classify biking as running, causing a device to falsely trigger a running session, within the fitness tracking application, when the user is actually biking. The example embodiment of the activity classification component 125 shown in FIG. 6 and described above may use the combination of trained models to address issue of misclassifying motion sensor data.

An isolation forest is an unsupervised learning algorithm for anomaly detection that works on the principle of isolating anomalies, instead of profiling normal points. In statistics, an anomaly, also known as an outlier, is an event that deviates so much from other events to raise suspicion it was generated by a different mean. Using isolation forests, as described herein, serves to enclose a boundary around the categories of interest (e.g., walking and running) so as to reject all other categories which may lie nearby in the feature space.

The system of the present disclosure may be executed by a wearable device, such as, a smart watch, smart earphones, a fitness tracking wristband, a smart ring, smart glasses, etc. One or more of the isolation forests may be personalized for a particular user wearing the wearable device.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 7:
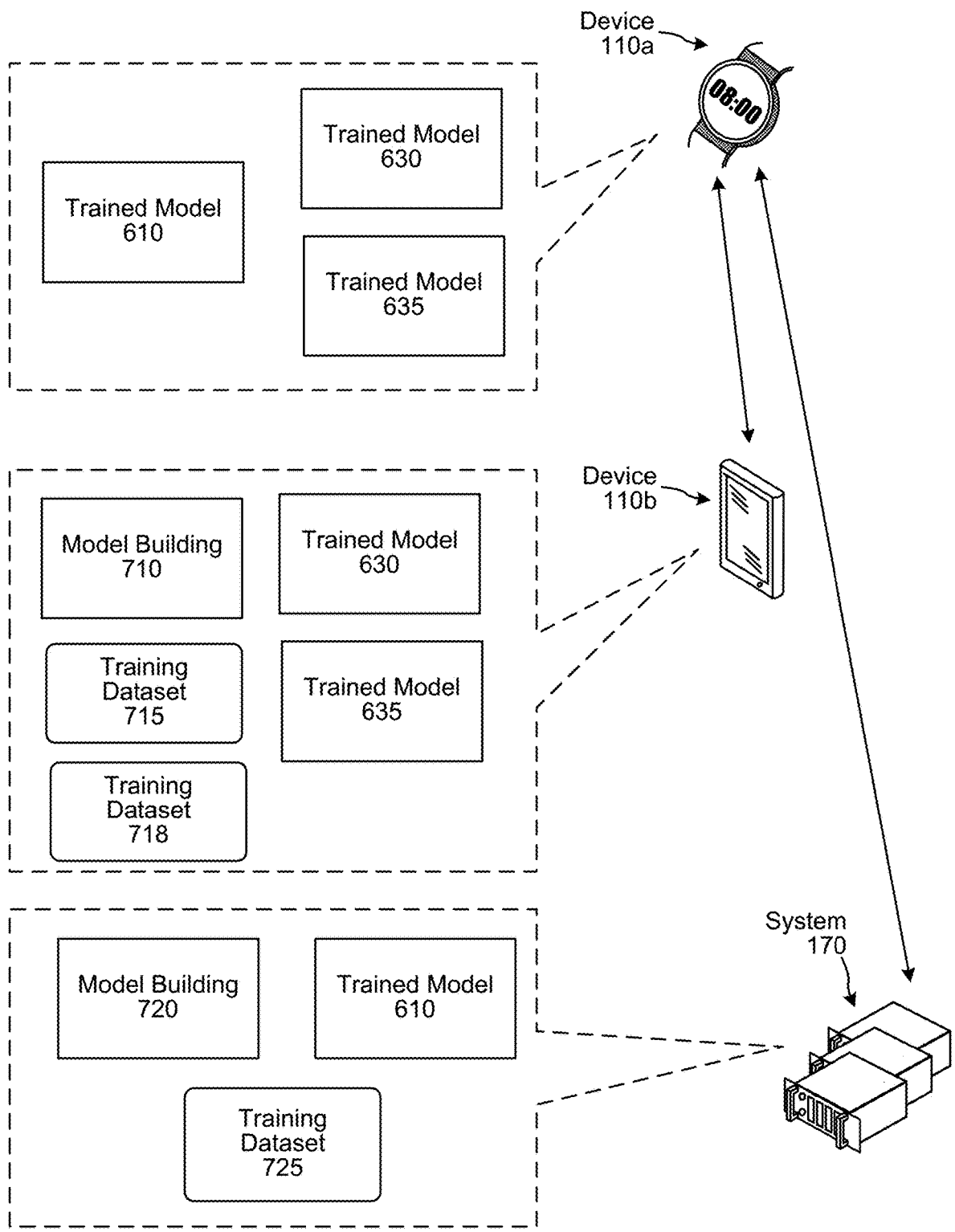
FIG. 7 is a conceptual diagram of how some machine learning models are trained at a first device and other machine learning models are trained at a system for use by a second device, according to embodiments of the present disclosure.

FIG. 7 is a conceptual diagram of how some machine learning models may be trained at a first device and other machine learning models are trained at a system for use by a second device, according to embodiments of the present disclosure. The device 110a (e.g., smart buds, smart watch, fitness tracker band, etc.) may include the trained model 610, the trained model 630, and the trained model 635 as part of the activity classification component 125. In some embodiments, the trained models 630 and 635 may be configured based on user-specific data corresponding to the user 105 (e.g., data corresponding to when the user 105 previously ran, data corresponding to when the user 105 previously rode a bike, etc.). Thus, the trained models 630 and 635 may be customized/personalized for the user 105.

A device 110b (e.g., a smartphone, a laptop, a tablet, or a desktop) associated with the user 105 (e.g., associated with the same user profile as the first device 110a) may be used to configure the trained models 630 and 635 using user-specific data. The device 110b, in some embodiments, may include a model building component 710 configured to process training data (e.g., training dataset 715 and training dataset 718) to determine the trained model 630 and the trained model 635. The training datasets 715 and 718 may include data (same type as the input data 112, e.g., motion sensor data) corresponding to the user 105 (in other words representing specifically how input data from the user 105 or associated with the user 105 is classified). The training dataset 715 may include data corresponding to a first activity category and may include labels/annotations identifying a first portion of the data corresponds to the first activity category (positive samples) and a second portion of the data does not correspond to the first activity category (negative samples). The training dataset 718 may include data corresponding to a second activity category and may include labels/annotations identifying a first portion of the data corresponds to the second activity category (positive samples) and a second portion of the data does not correspond to the second activity category (negative samples).

Using the training dataset 715, the model building component 710 may configure, for example, a first isolation forest to identify when input data, from the user 105, is an outlier for the first activity category. The model building component 710 may store the configured first isolation forest as the trained model 630. Using the training dataset 718, the model building component 710 may configure, for example, a second isolation forest to identify when input data, from the user 105, is an outlier for the second activity category. The model building component 710 may store the configured second isolation forest as the trained model 635. Once configured, the device 110b may send (push) the trained models 630 and 635 to the device 110a (for example via wired communication or wireless communication such as Bluetooth or over a network(s)) for runtime processing of input data captured by the device 110a. Thus, the trained models 630 and 635 may be customized/personalized for the user 105.

The system 170 may be used to configure the trained model 610. The system 170 may include a model building component 720 to configure the trained model 610 using training data (e.g., training dataset 725). The training dataset 725 may include data (same type as the input data 112, e.g., motion sensor data) along with labels/annotations identifying a first portion of the data corresponds to the first activity category, a second portion of the data corresponds to a second activity category, and a third portion of the data corresponds to "other" activity category (neither the first or second activity category). The data included in the training dataset 725 may correspond to multiple different users of the system 170. Using the training dataset 725, the model building component 720 may configure a machine learning model, for example a neural network to classify input data into the first activity category, the second activity category or the other activity category. The configured machine learning model may be stored as the trained model 610. Once configured, the system 170 may send (push) the trained model 610 to the device 110a for runtime processing of input data captured by the device 110a. In other example embodiments and based on the configuration of the activity classification component 125, the trained model 610 may be configured to classify data into more than two particular activity categories, in which case, the training dataset 725 may include labels/annotations representing which portions of the data correspond to which activity categories.

In an example embodiment, where the activity classification component 125 is configured to classify motion sensor data into user activity categories of walking, running or other, the training dataset 715 may include motion sensor data captured by the device 110a (or another device 110 associated with the user 105), and the labels/annotations may identify each 5-second portion of the motion sensor data as corresponding to walking or not corresponding to walking. The training dataset 718, in this case, may include motion sensor data captured by the device 110a (or another device 110 associated with the user 105), and the labels/annotations may identify each 5-second portion of the motion sensor data as corresponding to running or not corresponding to running. In this manner, using the foregoing training dataset 715 and 718, the trained models 630 and 635 may identify when motion sensor data corresponding to the specific user 105 indicates walking or running. This provides an improved user experience because different users may walk and/or run at a different pace. Customizing the trained models 630 and 635 may also enable the user 105 to indicate when the user is walking or running. For example, the user 105 may want a jogging activity to be considered as running, and may indicate the foregoing, via the device 110a or 110b, using a fitness tracker application. The training dataset 725 may include motion sensor data captured by multiple devices 110 associated with multiple different users, and the labels/annotations identifying 5-second portion of the motion sensor data as corresponding to walking, running or "other"/third user activity category. Thus, the trained model 610 may make an initial prediction based on generic data and the trained models 630 and 635 may make a prediction based on user-specific data.

In some embodiments, the trained models 630 and 635 may be initially configured, by the system 170, using training data corresponding to multiple different users (using generic data). After a certain amount of user-specific data is captured by the devices 110a, 110b or other devices 110 associated with the user 105, the device 110b may fine-tune the trained models 630 and 635 using the user-specific data represented in the training datasets 715 and 718, respectively.

In other example embodiments, the system 170 may be used to configure the trained model 610, the trained model 630 and the trained model 635. Once configured, the system 170 may send (push) the trained models 610, 630 and 635 to the device 110a for runtime processing. Alternatively, the system 170 may send (push) the trained models 610, 630 and 635 to the device 110b, which may send (push) the trained models 610, 630 and 635 to the device 110a for runtime processing.

In some embodiments, after runtime processing, the device 110a may send data to the system 170 representing the input data 112 and the corresponding final prediction data 645, which the system 170 may use to retrain/further configure the trained models 610, 630 and 635. The data sent to the system 170 may be a representation of the input data 112 so that the system 170 may not be able to identify the user 105 associated with the input data, and may not include a user profile identifier or other user identifying data. After runtime processing, in some embodiments, the device 110a may send data to the device 110b representing the input data 112 and the corresponding final prediction data 645, which the device 110b may use to retrain/fine-tune/further configure the trained models 630 and 635 for the user 105.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

Certain systems may be configured to perform actions responsive to user inputs. For example, for the user input of "Alexa, play music by <Artist>," a system may output music sung by the indicated artist. For further example, for the user input of "Alexa, what is the weather," a system may output synthesized speech representing weather information for a geographic location of the user. In yet further example, for the user input of "Alexa, start my fitness tracker" or "Alexa, I am going for a run," a system may cause a device, capable of tracking user activity (e.g., a fitness tracking bracelet, earbuds, a smartwatch, a smartphone, or other wearable devices), to initiate an application that receives sensor data and determines user activity as described above.

Figure 8:
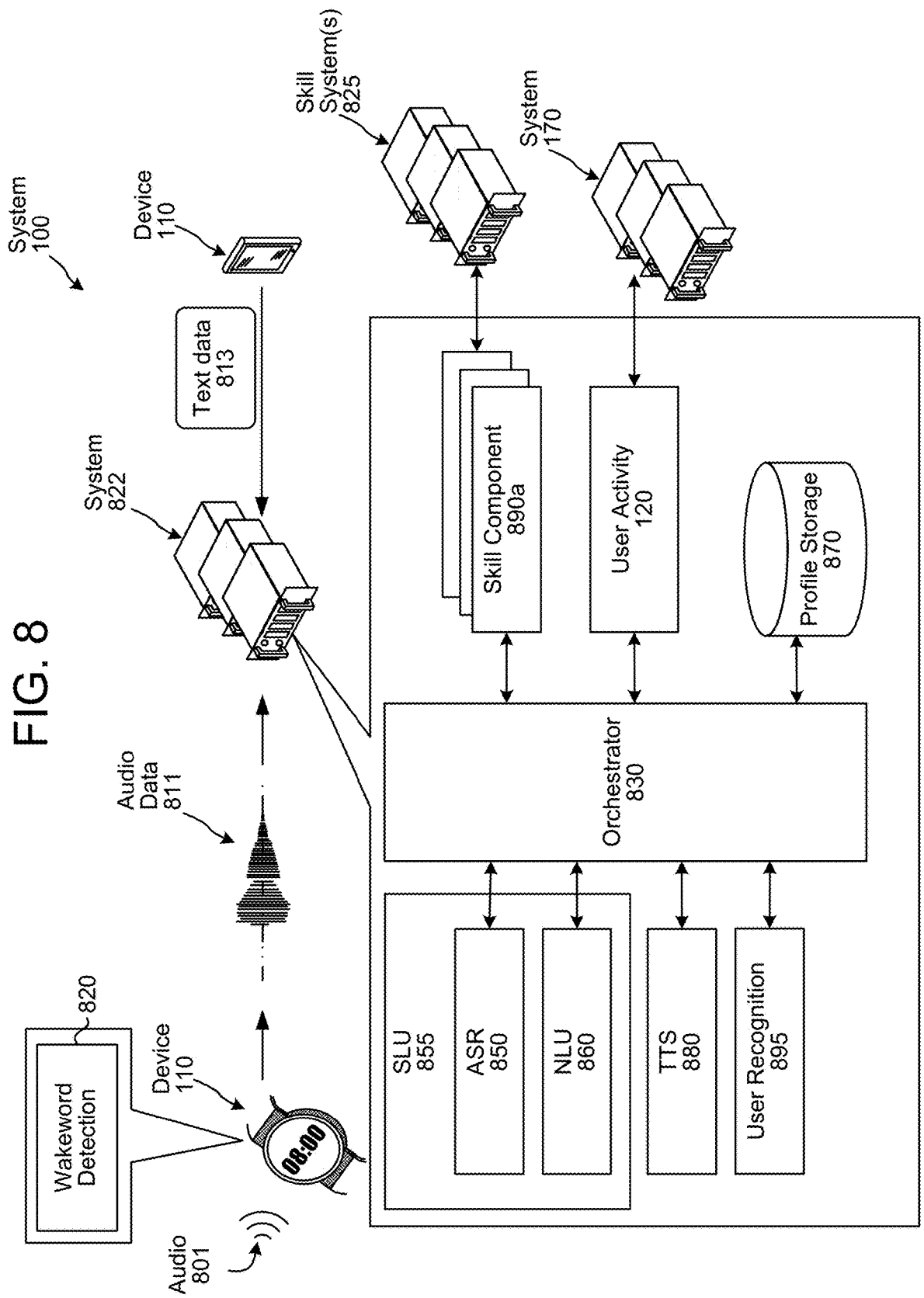
FIG. 8 is a conceptual diagram of components of a system, according to embodiments of the present disclosure.

The system 100 may operate using various components as illustrated in FIG. 8. The various components may be located on a same or different physical devices. Communication between various components may occur directly or across a network(s) 199.

A microphone or array of microphones (of or otherwise associated with a device 110) may capture audio 801. The device 110 processes audio data, representing the audio 801, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 801, the device 110 may determine if the speech is directed at the device 110/system 822. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 801, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Followon posterior threshold tuning or smoothing is applied for decision making. Other techniques for wakeword detection, such as those known in the art, may also be used.

Once the wakeword detection component 820 detects a wakeword, the device 110 may "wake" and begin transmitting audio data 811, representing the audio 801, to the system 822. The audio data 811 may include data corresponding to the detected wakeword, or the device 110 may remove the portion of the audio corresponding to the detected wakeword prior to sending the audio data 811 to the system 822.

The system 822 may include an orchestrator component 830 configured to, among other things, coordinate data transmissions between components of the system 822. The orchestrator component 830 may receive the audio data 811 from the device 110, and send the audio data 811 to an ASR component 850.

The ASR component 850 transcribes the audio data 811 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 811. Each ASR hypothesis may be associated with a score representing a confidence of ASR processing performed to determine the ASR hypothesis with which the score is associated.

The ASR component 850 interprets the speech in the audio data 811 based on a similarity between the audio data 811 and pre-established language models. For example, the ASR component 850 may compare the audio data 811 with models for sounds (e.g., subword units, such as phonemes, etc.) and sequences of sounds to identify words that match the sequence of sounds of the speech represented in the audio data 811.

In at least some instances, instead of the device 110 receiving audio 801, the device 110 may receive a text-based (e.g., typed) natural language user input. The device 110 may determine text data 813 representing the typed natural language user input, and may send the text data 813 to the system 822, wherein the text data 813 is received by the orchestrator component 830.

The orchestrator component 830 may send the text data 813 or ASR output data output, depending on the type of natural language user input received, to a NLU component 860. The NLU component 860 processes the ASR output data or text data to determine one or more NLU hypotheses embodied in NLU output data. The NLU component 860 may perform intent classification (IC) processing on the ASR output data or text data to determine an intent of the natural language user input. An intent corresponds to an action to be performed that is responsive to the natural language user input. To perform IC processing, the NLU component 860 may communicate with a database of words linked to intents. For example, a music intent database may link words and phrases such as "quiet," "volume off," and "mute" to a <Mute> intent. The NLU component 860 identifies potential intents by comparing words and phrases in ASR output data or text data to the words and phrases in an intents database. In at least some embodiments, the NLU component 860 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 860 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 860 may be linked to one or more grammar frameworks with "slots" to be filled. Each slot of a grammar framework corresponds to a portion of ASR output data or text data that the NLU component 860 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 860 may perform NER processing to identify words in ASR output data or text data as subject, object, verb, preposition, etc. based on grammar rules and/or models. Then, the NLU component 860 may perform IC processing that involves using the identified verb to identify an intent. Thereafter, the NLU component 860 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 860 may generate NLU output data including one or more NLU hypotheses, with each NLU hypothesis including the intent and slot(s) determined from IC processing and NER processing of the ASR output data or text data. In at least some embodiments, the NLU component 860 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 822 may perform speech processing using two different components (e.g., the ASR component 850 and the NLU component 860). In at least some embodiments, the system 822 may implement a spoken language understanding (SLU) component 855 configured to process audio data 811 to determine NLU output data.

The SLU component 855 may be equivalent to a combination of the ASR component 850 and the NLU component 860. Yet, the SLU component 855 may process audio data 811 and directly determine the NLU output data, without an intermediate step of generating ASR output data. As such, the SLU component 855 may take audio data 811 representing speech and attempt to make a semantic interpretation of the speech. That is, the SLU component 855 may determine a meaning associated with the speech and then implement that meaning. For example, the SLU component 855 may interpret audio data 811 representing speech from the user 105 in order to derive a desired action. The SLU component 855 may output a most likely NLU hypothesis, or multiple NLU hypotheses associated with respective confidence or other scores (such as probability scores, etc.).

The NLU component 860 (or the SLU component 855 depending on configuration of the system 822) may send the NLU output data to the orchestrator component 830. The orchestrator component 830 may send the top-scoring NLU hypothesis (in the NLU output data) to a skill associated with the NLU hypothesis.

The system 822 may include one or more skill components 890 and/or may communicate with one or more skill systems 825 via one or more skill components 890. As used herein, a "skill" may refer to a skill component 890, a skill system 825, or a combination of a skill component 890 and a skill system 825. A skill may be configured to execute with respect to NLU output data. For example, for an NLU hypothesis including a <GetWeather> intent, the system 822 (and more particularly the orchestrator component 830) may invoke a weather skill to determine and output weather information for a geographic location represented in a user profile or corresponding to a location of the device 110 that captured the corresponding natural language user input. For further example, for an NLU hypothesis including a <BookRide> intent, the system 822 (and more particularly the orchestrator component 830) may invoke a taxi skill to book a requested ride. In another example, for an NLU hypothesis including a <BuyPizza> intent, the system 822 (and more particularly the orchestrator component 830) may invoke a restaurant skill to place an order for a pizza. A skill may operate in conjunction between the system 822 and other devices, such as the device 110, restaurant electronic ordering systems, taxi electronic booking systems, etc. in order to complete certain functions. Inputs to a skill may come from speech processing interactions or through other interactions or input sources.

One example skill may be a fitness tracking skill. The user 105 may provide input audio 801 (an utterance) representing "start my fitness app" or other similar commands/requests, which may be processed by the SLU component 955 as described above to start/launch a fitness tracking skill. In other examples, the user 105 may provide audio 801 representing "start tracking running" or "I am going for a walk," which may be processed by the SLU component 955 to cause the fitness tracking skill to track motion sensor data captured by the device 110 as running or walking.

A skill may be associated with a domain, a non-limiting list of which includes a smart home domain, a music domain, a video domain, a weather domain, a communications domain, a flash briefing domain, a shopping domain, and a custom domain.

The system 822 may include a TTS component 880 that determine audio data (e.g., synthesized speech) from text data using one or more different methods. Text data input to the TTS component 880 may come from a skill, the orchestrator component 830, or another component of the system 822.

In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to determine audio data including an artificial speech waveform.

Parametric synthesis uses a computerized voice generator, sometimes called a vocoder.

The system 822 may include a user recognition component 895. The user recognition component 895 may recognize one or more users using various data. The user recognition component 895 may take as input the audio data 811. The user recognition component 895 may perform user recognition by comparing speech characteristics, in the audio data 811, to stored speech characteristics of users (e.g., stored speech characteristics associated with user profile identifiers associated with the device 110 that determined the audio data 811). The user recognition component 895 may additionally or alternatively perform user recognition by comparing biometric data (e.g., fingerprint data, iris data, retina data, etc.), received by the system 822 in correlation with a natural language user input, to stored biometric data of users (e.g., stored biometric data associated with user profile identifiers associated with the device 110 that determined the audio data 811 or otherwise captured a user input). The user recognition component 895 may additionally or alternatively perform user recognition by comparing image data (e.g., including a representation of at least a feature of a user), received by the system 822 in correlation with a natural language user input, with stored image data including representations of features of different users (e.g., stored image data associated with user profile identifiers associated with the device 110 that determined the audio data 811 or otherwise captured a user input). The user recognition component 895 may perform other or additional user recognition processes, including those known in the art. For a particular user input, the user recognition component 895 may perform processing with respect to stored data of users associated with the device 110 that captured the user input.

The user recognition component 895 determines whether a user input originated from a particular user. For example, the user recognition component 895 may determine a first value representing a likelihood that a user input originated from a first user, a second value representing a likelihood that user input originated from a second user, etc. The user recognition component 895 may also determine an overall confidence regarding the accuracy of user recognition processing.

The user recognition component 895 may output a single user profile identifier corresponding to the most likely user that originated the user input. Alternatively, the user recognition component 895 may output multiple user profile identifiers (e.g., in the form of an N-best list) with respective values representing likelihoods of respective users originating the user input. The output of the user recognition component 895 may be used to inform NLU processing, processing performed by a skill, as well as processing performed by other components of the system 822 and/or other systems.

The system 822 may include profile storage 870. The profile storage 870 may include a variety of data related to individual users, groups of users, devices, etc. that interact with the system 822. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 870 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 822 with permission to allow the skill to execute with respect to the user's natural language user inputs. If a user does not enable a skill, the system 822 may not invoke the skill to execute with respect to the user's natural language user inputs.

The profile storage 870 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 870 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

Figure 9:
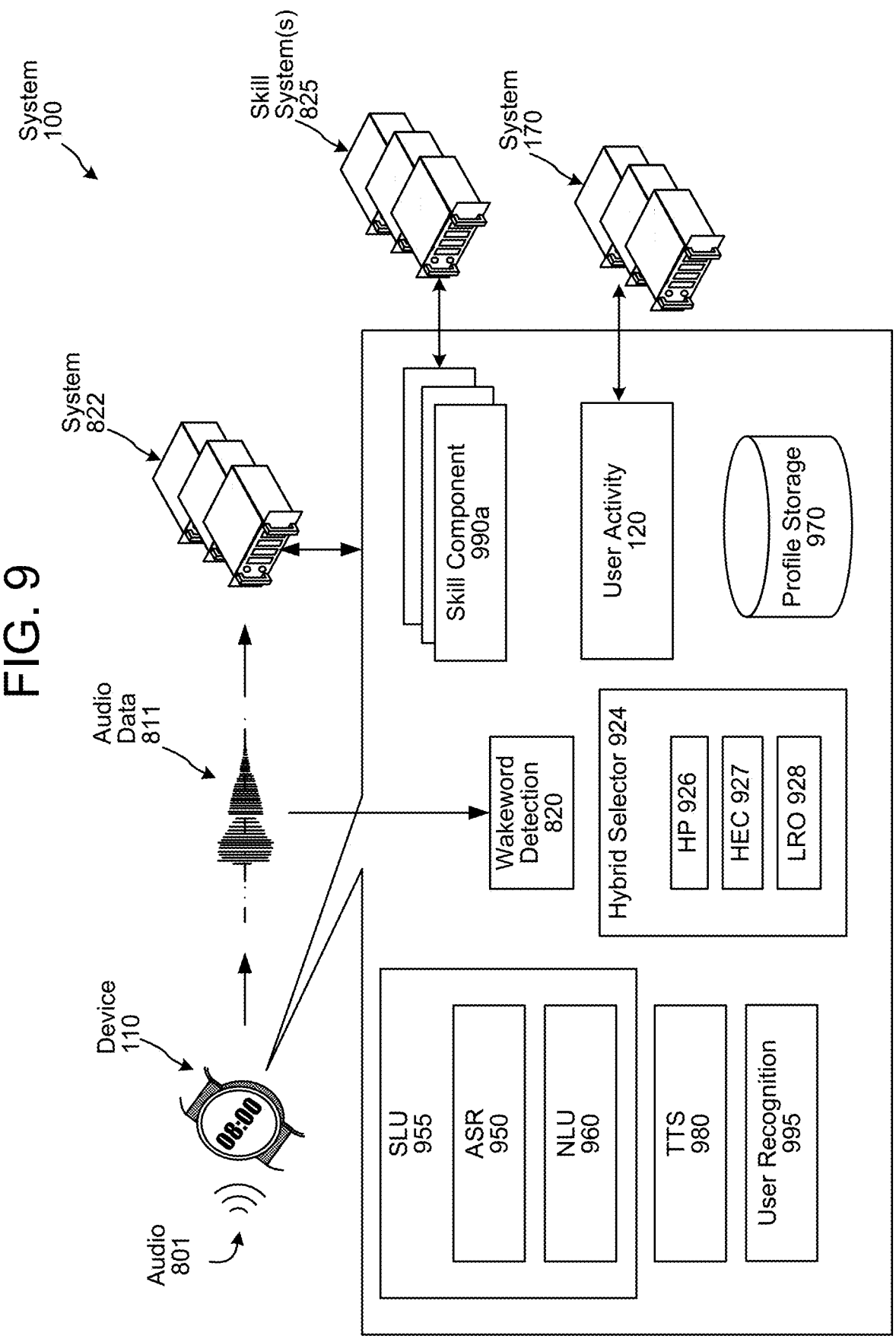
FIG. 9 is a conceptual diagram illustrating components that may be included in a device, according to embodiments of the present disclosure.

The foregoing describes illustrative components and processing of the system 822. In at least some embodiments, the device 110 may be configured to include some or all of the components, and perform some or all of the processing, of the system 822 described above. FIG. 9 illustrates such a configured device 110.

In at least some embodiments, the system 822 may receive the audio data 811 from the device 110, to recognize speech corresponding to a spoken input in the received audio data 811, and to perform functions in response to the recognized speech. In at least some embodiments, these functions involve sending directives (e.g., commands), from the system 822 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 822 over the network(s) 199, some or all of the functions capable of being performed by the system 822 may be performed by sending one or more directives over the network(s) 199 to the device 110, which, in turn, may process the directive(s) and perform one or more corresponding actions. For example, the system 822, using a remote directive that is included in response data (e.g., a remote response), may instruct the device 110 to output an audible response (e.g., using TTS processing performed by an on-device TTS component 980) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 822 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 8, the device 110 may include a wakeword detection component 820 configured to compare the audio data 811 to stored models used to detect a wakeword (e.g., "Alexa") that indicates to the device 110 that the audio data 811 is to be processed for determining NLU output data (e.g., slot data that corresponds to a named entity, label data, and/or intent data, etc.). In at least some embodiments, a hybrid selector 924, of the device 110, may send the audio data 811 to the wakeword detection component 820. If the wakeword detection component 820 detects a wakeword in the audio data 811, the wakeword detection component 820 may send an indication of such detection to the hybrid selector 924. In response to receiving the indication, the hybrid selector 924 may send the audio data 811 to the system 822 and/or the ASR component 950. The wakeword detection component 820 may also send an indication, to the hybrid selector 924, representing a wakeword was not detected. In response to receiving such an indication, the hybrid selector 924 may refrain from sending the audio data 811 to the system 822, and may prevent the ASR component 950 from further processing the audio data 811. In this situation, the audio data 811 can be discarded.

The device 110 may conduct its own speech processing using on-device language processing components, such as an SLU component 955 (an ASR component 950 and an NLU 960), similar to the manner discussed above with respect to the SLU component 855 (or ASR component 850 and the NLU component 860) of the system 822. The device 110 may also internally include, or otherwise have access to, other components such as one or more skill components 990 capable of executing commands based on NLU output data or other results determined by the device 110/system 822, a user recognition component 995 (configured to process in a similar manner to that discussed above with respect to the user recognition component 895 of the system 822), profile storage 970 (configured to store similar profile data to that discussed above with respect to the profile storage 870 of the system 822), or other components. In at least some embodiments, the profile storage 970 may only store profile data for a user or group of users specifically associated with the device 110. Similar to as described above with respect to FIG. 8, a skill component 990 may communicate with a skill system(s) 825.

In at least some embodiments, the on-device language processing components may not have the same capabilities as the language processing components of the system 822. For example, the on-device language processing components may be configured to handle only a subset of the natural language user inputs that may be handled by the system 822. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 822. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 822.

The hybrid selector 924, of the device 110, may include a hybrid proxy (HP) 926 configured to proxy traffic to/from the system 822. For example, the HP 926 may be configured to send messages to/from a hybrid execution controller (HEC) 927 of the hybrid selector 924. For example, command/directive data received from the system 822 can be sent to the HEC 927 using the HP 926. The HP 926 may also be configured to allow the audio data 811 to pass to the system 822 while also receiving (e.g., intercepting) this audio data 811 and sending the audio data 811 to the HEC 927.

In at least some embodiments, the hybrid selector 924 may further include a local request orchestrator (LRO) 928 configured to notify the ASR component 950 about the availability of new audio data 811 that represents user speech, and to otherwise initiate the operations of on-device language processing when new audio data 811 becomes available. In general, the hybrid selector 924 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 822 and chooses to use that remotely-determined directive data.

Thus, when the audio data 811 is received, the HP 926 may allow the audio data 811 to pass through to the system 822 and the HP 926 may also input the audio data 811 to the on-device ASR component 950 by routing the audio data 811 through the HEC 927 of the hybrid selector 924, whereby the LRO 928 notifies the ASR component 950 of the audio data 811. At this point, the hybrid selector 924 may wait for response data from either or both of the system 822 or the on-device language processing components. However, the disclosure is not limited thereto, and in some examples the hybrid selector 924 may send the audio data 811 only to the on-device ASR component 950 without departing from the disclosure. For example, the device 110 may process the audio data 811 on-device without sending the audio data 811 to the system 822.

The on-device ASR component 950 is configured to receive the audio data 811 from the hybrid selector 924, and to recognize speech in the audio data 811, and the on-device NLU component 960 is configured to determine a user intent from the recognized speech, and to determine how to act on the user intent by generating NLU output data which may include directive data (e.g., instructing a component to perform an action). Such NLU output data may take a form similar to that as determined by the NLU component 860 of the system 822. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 960) may be selected as usable to respond to a natural language user input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language user input, to use directive data received from the system 822, assuming a remote response is even received (e.g., when the device 110 is able to access the system 822 over the network(s) 199), or to determine output audio requesting additional information from the user 105.

The device 110 and/or the system 822 may associate a unique identifier with each natural language user input. The device 110 may include the unique identifier when sending the audio data 811 to the system 822, and the response data from the system 822 may include the unique identifier to identify which natural language user input the response data corresponds.

In at least some embodiments, the device 110 may include, or be configured to use, one or more skill components 990 that may work similarly to the skill component(s) 890 implemented by the system 822. The skill component(s) 990 may correspond to one or more domains that are used in order to determine how to act on a spoken input in a particular way, such as by outputting a directive that corresponds to the determined intent, and which can be processed to implement the desired operation. The skill component(s) 990 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 825. For example, a skill system 825 may be located in a remote environment (e.g., separate location) such that the device 110 may only communicate with the skill system 825 via the network(s) 199. However, the disclosure is not limited thereto. For example, in at least some embodiments, a skill system 825 may be configured in a local environment (e.g., home server and/or the like) such that the device 110 may communicate with the skill system 825 via a private network, such as a local area network (LAN).

As used herein, a "skill" may refer to a skill component 990, a skill system 825, or a combination of a skill component 990 and a skill system 825. One example skill may be a fitness tracking skill. The user 105 may provide input audio 801 (an utterance) representing "start my fitness app" or other similar commands/requests, which may be processed by the SLU component 955 as described above to start/launch a fitness tracking skill. In other examples, the user 105 may provide audio 801 representing "start tracking running" or "I am going for a walk," which may be processed by the SLU component 955 to cause the fitness tracking skill to track motion sensor data captured by the device 110 as running or walking.

Figure 10:
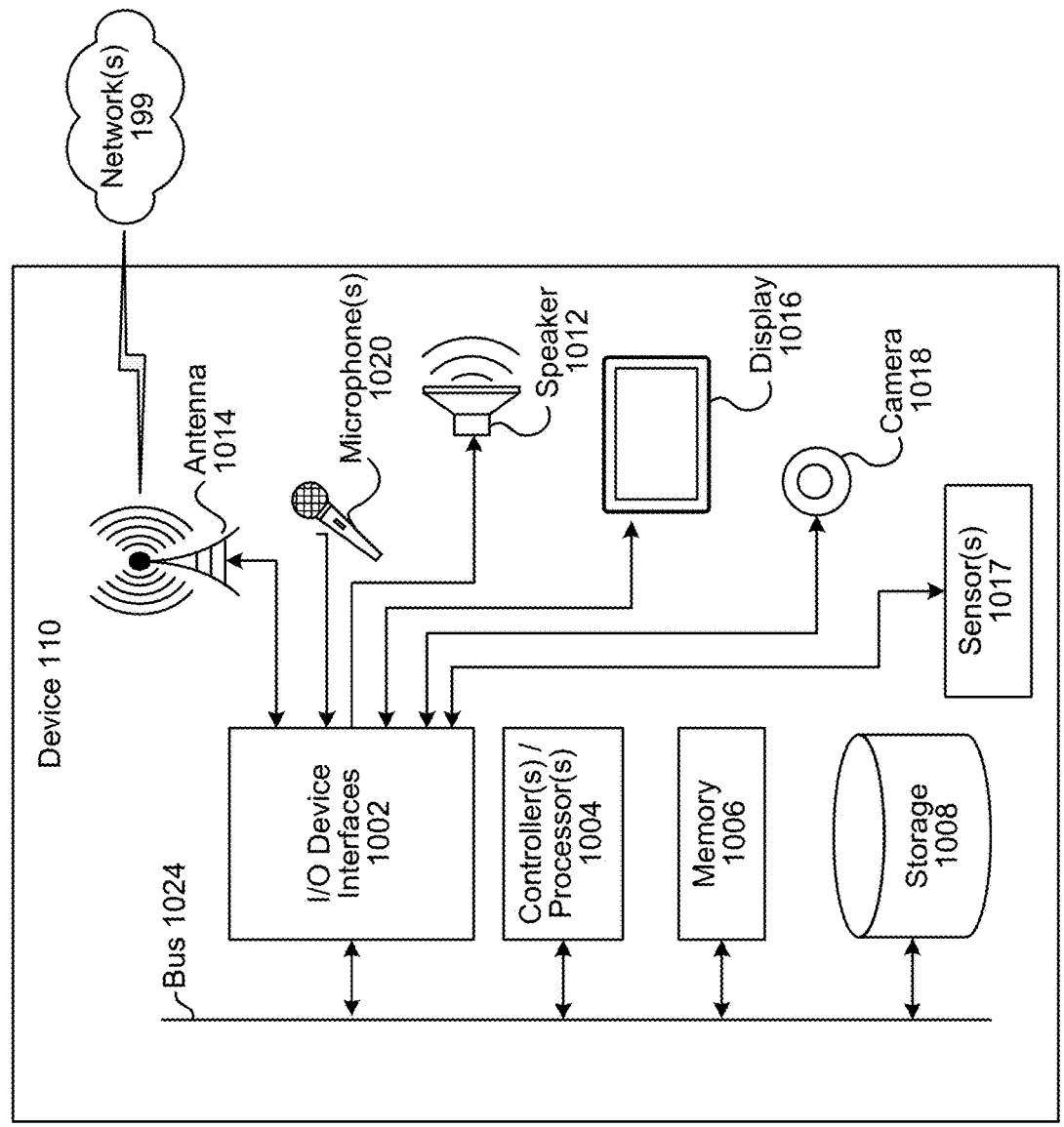
FIG. 10 is a block diagram conceptually illustrating example components of a device, according to embodiments of the present disclosure.
Figure 11:
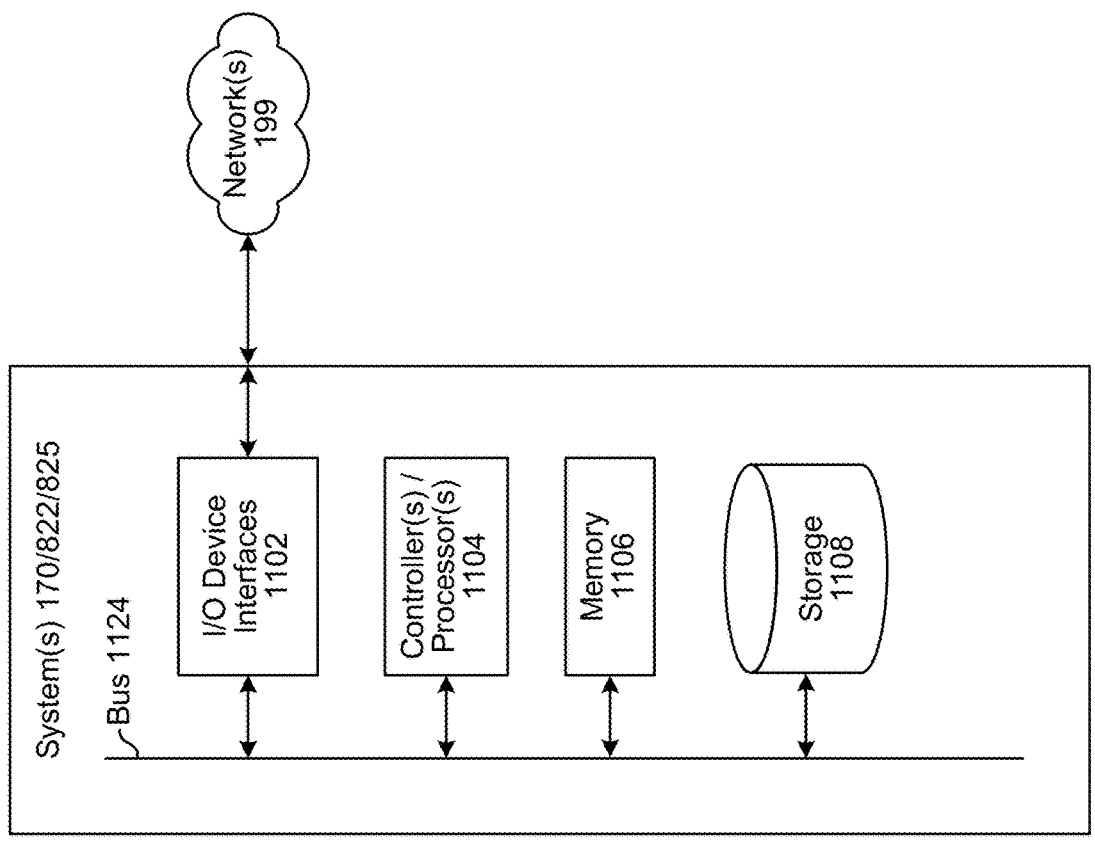
FIG. 11 is a block diagram conceptually illustrating example components of a system, according to embodiments of the present disclosure.

FIG. 10 is a block diagram conceptually illustrating example components of a device 110 according to the present disclosure. FIG. 11 is a block diagram conceptually illustrating example components of a system, such as the system 822 or a skill system 825. A system (170/120/825)

may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 822 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (170/822/825) may be included in the system 100 of the present disclosure, such as one or more systems 822 for performing ASR processing, one or more systems 822 for performing NLU processing, and one or more skill systems 825, etc. In operation, each of these systems may include computer-readable and computer-executable instructions that reside on the respective device (170/822/825), as will be discussed further below.

Each of these devices (110/170/822/825) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/822/825) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/822/825) may also be connected to removable or external non-volatile memory and/or storage (such as a removable memory card, memory key drive, networked storage, etc.) through respective input/output device interfaces (1002/1102).

Computer instructions for operating each device (110/170/822/825) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/170/822/825) includes input/output device interfaces (1002/1102). A variety of components may be connected through the input/output device interfaces (1002/1102), as will be discussed further below. Additionally, each device (110/822/825) may include an address/data bus (1024/1124) for conveying data among components of the respective device. Each component within a device (110/822/825) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may include one or more sensors 1017, for example, motion sensors such as accelerometers, gyroscopes, GPS, etc. The device 110 may include other sensors 1017 such as heart rate sensors, temperature sensors, pulse sensors, barometers, orientation sensors, etc. The device 110 may further include a camera 1018.

Via antenna(s) 1014, the input/output device interfaces 1002 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the system 170, the system 822, and/or a skill system 825 may include their own dedicated processors, memory, and/or storage. Alternatively, one or more of the components of the device 110, the system 170, the system 822, and/or a skill system 825 may utilize the I/O interfaces (1002/1102), processor(s) (1004/1104), memory (1006/1106), and/or storage (1008/1108) of the device(s) 110, system 822, or the skill system 825, respectively. Thus, the ASR component 850 may have its own I/O interface(s), processor(s), memory, and/or storage; the NLU component 860 may have its own I/O interface(s), processor (s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 822, and a skill system 825, as described herein, are illustrative, and may be located as a stand-alone device or may be included, in whole or in part, as a component of a larger device or system.

Figure 12:
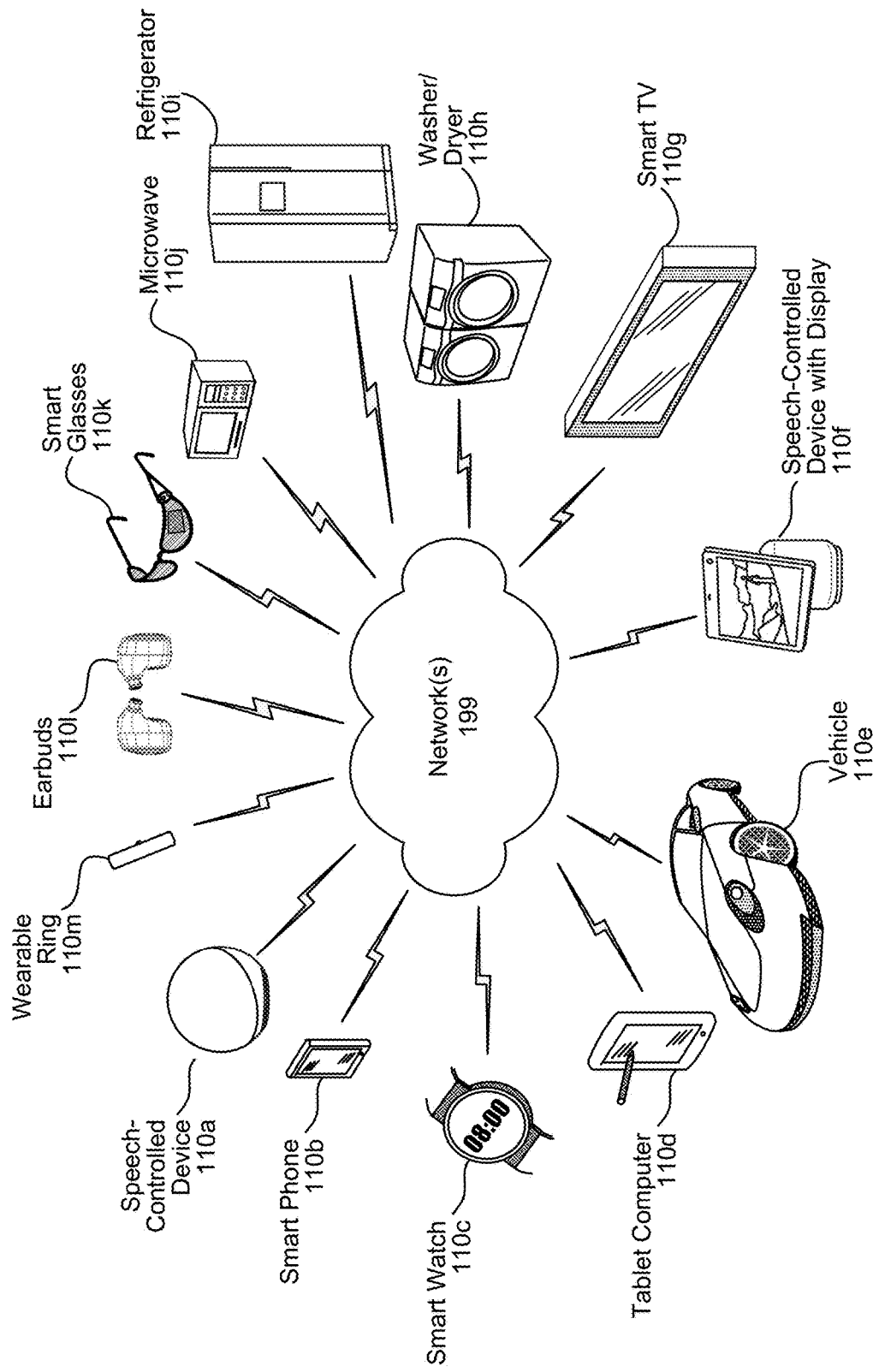
FIG. 12 illustrates an example of a computer network for use with the overall system, according to embodiments of the present disclosure.

As illustrated in FIG. 12, multiple devices (110a-110l) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s)

110*h*, a refrigerator(s) 110*i*, a microwave(s) 110*j*, smart glasses 110*k*, earbuds 110*l*, and/or a wearable ring(s) 110*m*.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first motion sensor data captured by a motion sensor of a device during a first time duration;
   processing the first motion sensor data using a trained classifier model to determine a first activity category corresponding to the first motion sensor data, the trained classifier model configured to classify motion sensor data into a plurality of activity categories, wherein the first activity category corresponds to a walking activity or a running activity;
   receiving a first step count value representing a number of steps that were taken by a user of the device during a time period occurring prior to the first time duration;
   determining, based at least in part on the first activity category and the first step count value, a first threshold value for counting steps taken by the user during the first time duration, the first threshold value representing a minimum magnitude of motion sensor data for a step to be counted; and
   determining, using the first motion sensor data and the first threshold value, a second step count value representing a second number of steps taken by the user during the first time duration.

2. The computer-implemented method of claim 1, further comprising:
   receiving second motion sensor data captured by the motion sensor during a second time duration;
   processing the second motion sensor data using the trained classifier model to determine a second activity category corresponding to the second motion sensor data, wherein the second activity category corresponds to a non-step activity;
   determining, based at least in part on the second activity category, a second threshold value for counting steps taken by the user during the second time duration, the second threshold value being greater than the first threshold value; and
   determining, using the second motion sensor data and the second threshold value, a third step count value representing a third number of steps taken by the user during the second time duration.

3. The computer-implemented method of claim 1, further comprising:
   determining, using the first step count value, a step rate for the user;
   receiving a previous threshold value used to count steps taken by the user during a previous time duration occurring prior to the first time duration; and
   determining the first threshold value based at least in part on the step rate and the previous threshold value.

4. A computer-implemented method comprising:
   receiving first motion sensor data acquired by a device during a first time duration;
   receiving a first step count value representing a first number of steps that were taken by a user of the device during a time period occurring prior to the first time duration;
   determining, using the first step count value, a first threshold value for counting steps taken by the user during the first time duration; and
   determining, using the first motion sensor data and the first threshold value, a second step count value representing a second number of steps taken by the user during the first time duration.

5. The computer-implemented method of claim 4, further comprising:
determining, using the first motion sensor data, that the user was engaged in a step-based activity during the first time duration; and
determining the first threshold value further based at least in part on the user having been engaged in the step-based activity during the first time duration.

6. The computer-implemented method of claim 5, further comprising:
receiving second motion sensor data acquired by the device during a second time duration;
determining, using the second motion sensor data, that the user was engaged in a non-step based activity during the second time duration;
determining a second threshold value based at least in part on the user having been engaged in the non-step based activity during the second time duration, wherein the second threshold value is greater than the first threshold value; and
determining, using the second motion sensor data and the second threshold value, a third step count value representing a third number of steps taken by the user during the second time duration.

7. The computer-implemented method of claim 4, further comprising:
determining, using the first step count value, a step rate for the user;
receiving a previous threshold value used to count steps taken by the user during a previous time duration occurring prior to the first time duration;
determining, using a function, a multiplier value based on the step rate; and
determining the first threshold value based at least in part on the multiplier value and the previous threshold value.

8. The computer-implemented method of claim 4, further comprising:
determining, using the first step count value, a step rate for the user;
determining that the step rate satisfies a condition;
receiving a previous threshold value used to count steps taken by the user during a previous time duration occurring prior to the first time duration; and
based at least in part on the step rate satisfying the condition, using the previous threshold value as the first threshold value.

9. The computer-implemented method of claim 4, further comprising:
determining, using the first motion sensor data, that the user was engaged in a first activity during the first time duration;
receiving second motion sensor data acquired by the device during a second time duration occurring after the first time duration;
determining, using the second motion sensor data, that the user was engaged in a second activity during the second time duration;
receiving past activity data acquired by the device during a time period occurring prior to the first time duration, the past activity data having been acquired while the user was engaged in the second activity; and
based at least in part on the past activity data and the user having been engaged in the second activity during the second time duration, determining that the user was engaged in the second activity instead of the first activity during the first time duration.

10. The computer-implemented method of claim 4, further comprising:
processing the first motion sensor data using a trained classifier model to determine that the first motion sensor data corresponds to a walking activity category, wherein the trained classifier model is configured to determine whether motion sensor data corresponds to the walking activity category, a running activity category, a cycling activity category, or a rowing activity category; and
determining the first threshold value further based on the first motion sensor data corresponding to the walking activity category.

11. The computer-implemented method of claim 4, further comprising:
receiving second motion sensor data acquired by the device during a second time duration occurring subsequent to the first time duration;
determining, using the first step count value, the second step count value and the first threshold value, a second threshold value for counting steps taken by the user during the second time duration; and
determining, using the second motion sensor data and the second threshold value, a third step count value representing a second number of steps taken by the user during the second time duration.

12. The computer-implemented method of claim 4, further comprising:
determining, using a first trained model, first prediction data indicating that the first motion sensor data corresponds to a first activity category of a plurality of activity categories;
determining, using the first trained model, first feature data corresponding to the first motion sensor data;
determining, using a second trained model and the first feature data, that the first motion sensor data corresponds to the first activity category, wherein the second trained model is configured to determine whether or not the first motion sensor data corresponds to the first activity category; and
storing first data associating the first motion sensor data with the first activity category.

13. A system comprising:
at least one processor; and
at least one memory including instructions that, when executed by the at least one processor, cause the system to:
receive first sensor data acquired by a device during first time duration;
receive a first repetition count value representing a first number of activity repetitions that were engaged in by a user of the device during a time period occurring prior to the first time duration;
determine, using the first repetition count value, a first threshold value for counting activity repetitions engaged in by the user during the first time duration; and
determine, using the first sensor data and the first threshold value, a second repetition count value representing a second number of activity repetitions engaged in by the user during the first time duration.

14. The system of claim 13, wherein the at least one memory further includes additional instructions that, when executed by the at least one processor, further cause the system to:

determine, using the first sensor data, that the user was engaged in a repetition-based activity during the first time duration; and
determine the first threshold value further based at least in part on the user having been engaged in the repetition-based activity during the first time duration.

15. The system of claim 14, wherein the at least one memory further includes additional instructions that, when executed by the at least one processor, further cause the system to:
receive second sensor data acquired by the device during a second time duration;
determine, using the second sensor data, that the user was engaged in a non-repetition based activity during the second time duration;
determine a second threshold value based at least in part on the user having been engaged in the non-repetition based activity during the second time duration, wherein the second threshold value is greater than the first threshold value; and
determine, using the second sensor data and the second threshold value, a third repetition count value representing a third number of activity repetitions engaged in by the user during the second time duration.

16. The system of claim 13, wherein the at least one memory further includes additional instructions that, when executed by the at least one processor, further cause the system to:
determine, using the first repetition count value, an activity repetition rate for the user;
receive a previous threshold value used to count activity repetitions engaged in by the user during a previous time duration occurring prior to the first time duration;
determine, using a function, a multiplier value based on the activity repetition rate; and
determine the first threshold value based at least in part on the multiplier value and the previous threshold value.

17. The system of claim 13, wherein the at least one memory further includes additional instructions that, when executed by the at least one processor, further cause the system to:
determine, using the first repetition count value, an activity repetition rate for the user;
determine that the activity repetition rate satisfies a condition;
receive a previous threshold value used to count activity repetitions engaged in by the user during a previous time duration occurring prior to the first time duration; and
based at least in part on the activity repetition rate satisfying the condition, use the previous threshold value as the first threshold value.

18. The system of claim 13, wherein the at least one memory further includes additional instructions that, when executed by the at least one processor, further cause the system to:
determine, using the first sensor data, that the user was engaged in a first activity during the first time duration;
receive second sensor data acquired by the device during a second time duration occurring after the first time duration;
determine, using the second sensor data, that the user was engaged in a second activity during the second time duration;
receive past activity data acquired by the device during a time period occurring prior to the first time duration, the past activity data having been acquired while the user was engaged in the second activity; and
based at least in part on the past activity data and the user having been engaged in the second activity during the second time duration, determine that the user was engaged in the second activity instead of the first activity during the first time duration.

19. The system of claim 13, wherein the at least one memory further includes additional instructions that, when executed by the at least one processor, further cause the system to:
process the first sensor data using a trained classifier model to determine that the first sensor data corresponds to a rowing activity category, wherein the trained classifier model is configured to determine whether sensor data corresponds to a walking activity category, a running activity category, a cycling activity category, or the rowing activity category; and
determine the first threshold value further based on the first sensor data corresponding to the rowing activity category.

20. The system of claim 13, wherein the at least one memory further includes additional instructions that, when executed by the at least one processor, further cause the system to:
receive second sensor data acquired by the device during a second time duration occurring subsequent to the first time duration;
determine, using the first repetition count value, the second repetition count value and the first threshold value, a second threshold value for counting activity repetitions engaged in by the user during the second time duration; and
determine, using the second sensor data and the second threshold value, a third repetition count value representing a third number of activity repetitions engaged in by the user during the second time duration.

* * * * *